US007377301B2

(12) United States Patent
Takagi et al.

(10) Patent No.: US 7,377,301 B2
(45) **Date of Patent: *May 27, 2008**

(54) ADHESIVE DISPENSING APPARATUS AND IMAGE FORMING APPARATUS

(75) Inventors: Katsumasa Takagi, Kofu (JP); Masaya Takahashi, Nakakoma-gun (JP); Shuji Ishimaru, Kofu (JP); Yoshinobu Kono, Higashiyatsushiro-gun (JP); Misao Kobayashi, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,652

(22) Filed: Oct. 3, 2006

(65) Prior Publication Data

US 2007/0023148 A1 Feb. 1, 2007

Related U.S. Application Data

(63) Continuation of application No. 10/795,268, filed on Mar. 9, 2004, now Pat. No. 7,314,075.

(30) Foreign Application Priority Data

Apr. 4, 2003 (JP) ............................ 2003-102289
Apr. 4, 2003 (JP) ............................ 2003-102290
Apr. 4, 2003 (JP) ............................ 2003-102291

(51) Int. Cl.
*B32B 37/00* (2006.01)

(52) U.S. Cl. ...................... 156/578; 156/387; 156/556; 412/33; 412/37

(58) Field of Classification Search ................ 156/556, 156/575, 578, 384, 387; 412/8, 33, 37, 41, 412/900, 901, 902
See application file for complete search history.

(56) References Cited

U.S. PATENT DOCUMENTS 4,537,650 A * 8/1985 Coons, Jr. ................... 156/384
5,114,292 A * 5/1992 Geiser ......................... 412/11
6,467,522 B1 * 10/2002 Durney et al. .............. 156/355

* cited by examiner

*Primary Examiner*—James Sells
(74) *Attorney, Agent, or Firm*—Manabu Kanesaka

(57) ABSTRACT

An adhesive dispensing apparatus for dispensing an adhesive on a sheet bundle includes a support device for supporting the sheet bundle, a dispensing device disposed adjacent to the support device for dispensing the adhesive on an edge of the sheet bundle supported by the support device, and a transport device disposed adjacent to the support device for transporting the sheet bundle from the edge, to which the adhesive is applied, as a leading edge in a transport direction. A refilling device is provided for refilling the adhesive to the dispensing device, and a moving device moves the dispensing device between a dispending position where the adhesive is dispensed to the edge of the sheet bundle and a refilling position where the adhesive is supplied to the dispensing device from the refilling device.

17 Claims, 32 Drawing Sheets

181
68b
181a
66
66a 181
66a
68b
66
263
180
261
260

181a
180

ADHESIVE DISPENSING APPARATUS AND IMAGE FORMING APPARATUS

CROSS-REFERENCE TO RELATED APPLICATION

This is a continuation application of Ser. No. 10/795,268 filed on Mar. 9, 2004 now U.S. Pat. No. 7,314,075.

BACKGROUND OF THE INVENTION AND RELATED ART STATEMENT

The present invention relates to an adhesive dispensing apparatus for dispensing an adhesive to a bundle of sheets and an image forming apparatus provided with the adhesive dispensing apparatus.

In general, a sheet processing apparatus such as a finisher equipped in a binding apparatus or image forming apparatus is able to perform a process of stitching a bundle of sheets after the sheets are bound in a bundle, and a process of dispensing an adhesive such as glue on an edge of a bundle of sheets.

In such a process of dispensing an adhesive, the adhesive is dispensed on an edge of the bundle, and the bundle is transported in a direction along the edge thereof. Then, the sheet bundle is moved relative to a cover sheet in a direction perpendicular to the transport direction, so that the cover sheet is attached to the edge of the bundle with the adhesive dispensed thereon (refer to Japanese Patent Publication (Kokai) No. 2000-168264).

When the sheet bundle is transported in the direction along the edge of the sheet bundle after the adhesive is dispensed thereto, the edge of the sheet bundle may contact various members such as a wall of a transport path. In such a case, if the sheet bundle is transported in a skew, or an excessive amount of the adhesive is dispensed to the edge of the sheet bundle, the adhesive dispensed to the edge of the sheet bundle may be scraped off. If the adhesive is scraped off from the edge of the sheet bundle during the transportation, the sheet bundle may not be bound well or the cover sheet may not be attached to the sheet bundle. Also, if the adhesive sticks to a wall of a transport path, it is difficult to transport a subsequent sheet bundle.

To solve such problems, in a conventional apparatus, a transport path is structured such that an edge of a sheet bundle is away from a wall thereof with a sufficient distance, or a special device is provided for strictly controlling an amount of an adhesive. Accordingly, such an apparatus tends to be large and high cost.

In view of the problems described above, an object of the present invention is to provide an adhesive dispensing apparatus and an image forming apparatus with a compact size and low cost, in which an adhesive is not scraped off when a sheet bundle is transported after the adhesive is dispensed thereto, so that a cover sheet is securely attached to the sheet bundle.

Further objects and advantages of the invention will be apparent from the following description of the invention.

SUMMARY OF THE INVENTION

To attain the objects described above, according to the present invention, an adhesive dispensing apparatus and image forming apparatus include support means for supporting a sheet bundle, dispensing means for dispensing an adhesive to an edge of the sheet bundle supported by the support means, and transport means for transporting the sheet bundle with the edge having the adhesive dispensed by the dispensing means as a leading edge.

In the adhesive dispensing apparatus and image forming apparatus of the present invention, the sheet bundle is transported with the edge having the adhesive dispensed thereto as the leading edge. Therefore, the edge of the sheet bundle does not contact the transport path during the transportation, and the adhesive is not scraped off. Accordingly, it is not necessary to provide a large space in a transport path, or provide a special device for strictly controlling an amount of the adhesive. It is possible to securely bind together each of the sheets of the sheet bundle and securely attach a cover sheet to the sheet bundle without increasing a size of the apparatus or cost. Also, the adhesive does not stick to a wall of the transport path, so that a subsequent sheet bundle is transported smoothly.

According to the present invention, an adhesive dispensing apparatus and image forming apparatus include support means for supporting a sheet bundle, dispensing means for dispensing an adhesive to an edge of the sheet bundle supported by the support means, cover sheet supply means for setting a cover sheet at a predetermined position, and transport means for transporting the sheet bundle with the edge having the adhesive dispensed by the dispensing means as the leading edge and for pressing the edge of the sheet bundle against the cover sheet set at the predetermined position. When the sheet bundle is transported using a rotating body such as a roller, a skew in a transport direction may be generated between sheets (during the transportation). In the adhesive dispensing apparatus and image forming apparatus, it is possible to correct the skew by pressing the edge of the sheet bundle against the cover sheet.

According to the present invention, the adhesive dispensing apparatus and image forming apparatus may further include moving means for moving the dispensing means between a first position where the adhesive is dispensed to the edge of the sheet bundle and a second position where the dispensing means does not hinder the transport means to transport the sheet bundle. With this configuration, instead of moving the sheet bundle to avoid the dispensing means, the dispensing means moves to ensure the transport path for the sheet bundle with the adhesive dispensed thereto, thereby reducing a shift of the sheet bundle after the adhesive is dispensed.

According to the present invention, the transport means of the adhesive dispensing apparatus and image forming apparatus may include gripping members for transporting and pushing the sheet bundle toward the cover sheet set at the predetermined position while the gripping members nip the sheet bundle or the gripping members contact a trailing edge of the sheet bundle in the transport direction. With this configuration, even if the sheets are skewed in the transport direction while the transport means transports the sheet bundle, the gripping members push the sheet bundle toward the cover sheet set at the predetermined position while the gripping members nip the sheet bundle or the gripping member contact the trailing edge of the sheet bundle in the transport direction, so that the gripping members push the sheet bundle to correct the skew thereof and the cover sheet is securely attached to the sheet bundle.

According to the present invention, an adhesive dispensing apparatus and image forming apparatus include support means for supporting a sheet bundle in a state standing in a substantially vertical direction; dispensing means disposed under the supporting means for dispensing an adhesive to a bottom edge of the sheet bundle supported by the support means; moving means for moving the dispensing means between a first position where the adhesive is dispensed to the bottom edge of the sheet bundle and a second position where the dispensing means does not hinder the transport means to transport the sheet bundle; and transport means for transporting downwardly the sheet bundle with the edge having the adhesive dispensed by the dispensing means as a leading edge. In addition to this configuration, cover sheet supply means is disposed below the dispensing means for setting a cover sheet at a predetermined position. Accordingly, the sheet bundle is transported downwardly with the edge having the adhesive dispensed thereto as the leading edge toward the cover sheet. Therefore, even if the adhesive drips, the cover sheet receives the adhesive and the adhesive does not stick to other portions of the apparatus, thereby preventing a problem.

According to the present invention, an image forming apparatus has the features described above.

DETAILED DESCRIPTION OF PREFERRED EMBODIMENTS

Figure 1:
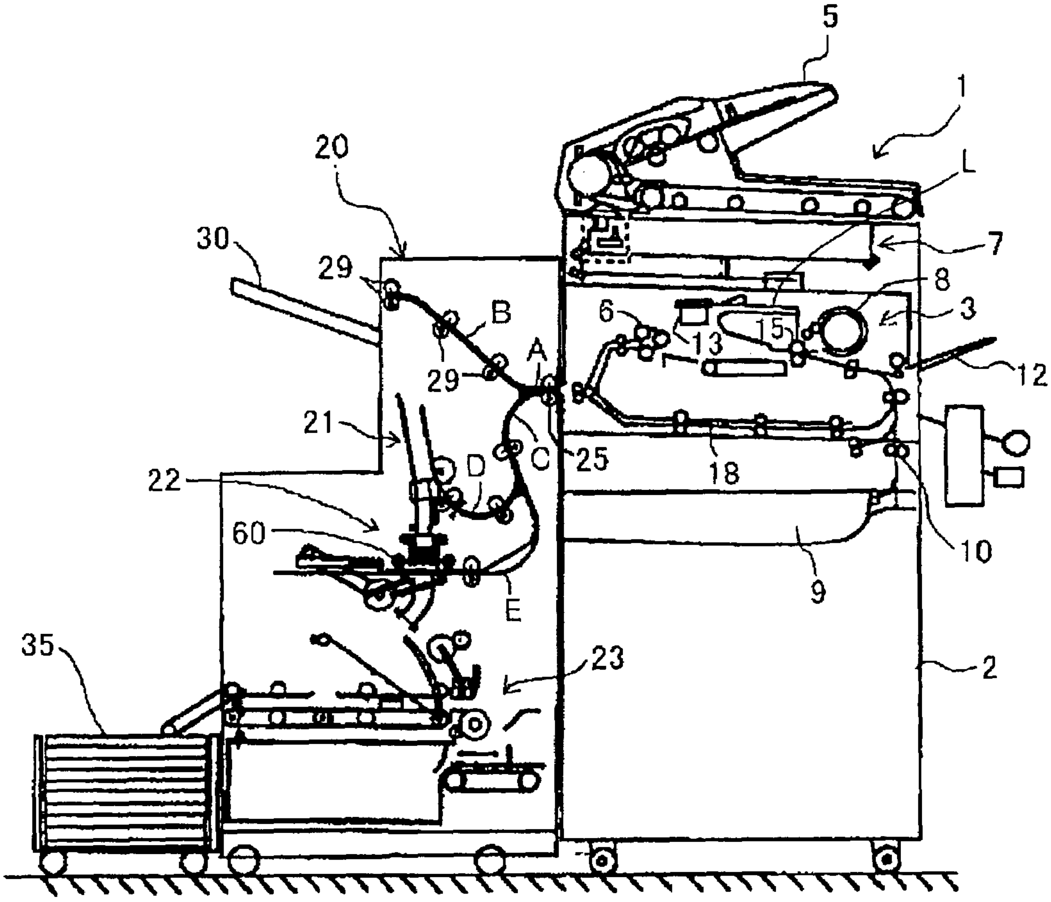
FIG. 1 is a view showing an image forming apparatus equipped with a sheet processing apparatus having an adhesive dispensing apparatus according to the present invention.

Hereunder, embodiments of the present invention will be explained with reference to the accompanying drawings. FIG. 1 shows a sheet processing apparatus 20 provided with an adhesive dispensing apparatus according to a first embodiment of the present invention, and a copier 1 provided with the sheet processing apparatus 20 as an example of an image forming apparatus.

As shown in FIG. 1, an image forming unit 3 is disposed inside an apparatus main unit 2 of the copier 1. The image forming unit 3 forms images on sheets such as regular paper or OHP. Specifically, an original feeding apparatus 5 is mounted onto the top of the apparatus main unit 2. Originals automatically are fed from the original feeding apparatus 5, and are optically read by an optical reading means 7. The image information is converted into digital signals to be sent to the image forming apparatus 3.

In the image forming apparatus 3, laser light L from the optical irradiating means 13 is reflected to an outer surface of a photosensitive drum 15 according to the digital signal, so that a static latent image corresponding to the image on the original is formed on the photosensitive drum 15. Toner is supplied to the static latent image from a developer apparatus arranged around the photosensitive drum 15 while the photosensitive drum 15 rotates to make the static latent image visible. After the toner image becomes visible, the toner image is transferred to the sheet S fed to the transfer unit under a predetermined timing. Note that a sheet S to which the image is transferred is fed one at a time from a sheet cassette mounted below the apparatus main unit 2 using transport rollers 10. It is also possible to feed the sheets from a multi-sheet tray 12.

The sheet S to which the toner image is transferred by the toner unit is transported to a fixing device 6 where the toner image is permanently fixed to the surface of the sheet by applying heat and pressure thereto. When the apparatus main unit 2 is set in a single-side mode, the sheet S passes through the fixing device 6 and travels to the sheet finishing apparatus 20. On the other hand, when the apparatus main unit 2 is set in a duplex recording mode, the sheet S with the image formed on one side thereof is passed through the fixing device 6, then is switched back and transported to the re-transport path 18. Next, the sheet is fed again to the image forming apparatus 3 where images are formed on the other side of the sheet S in the same manner. The sheet S is then sent to the sheet finishing apparatus 20. Note that the apparatus main unit 2 sends a sheet size signal to the sheet finishing apparatus 20 to switch the transport path inside the sheet finishing apparatus 20 in advance before the sheet S is fed into the sheet finishing apparatus 20.

The sheet finishing apparatus 20 comprises at least a transporting and alignment unit 21 for transporting and aligning the sheet S, an adhesive dispensing unit 22, and a cutting unit 23. In the apparatus, it is possible to select a normal discharge mode as well as an adhesive binding mode or cutting mode. Note that the sheet bundle S1 can be cut at three edges thereof other than an edge with an adhesive applied thereon.

Figure 2:
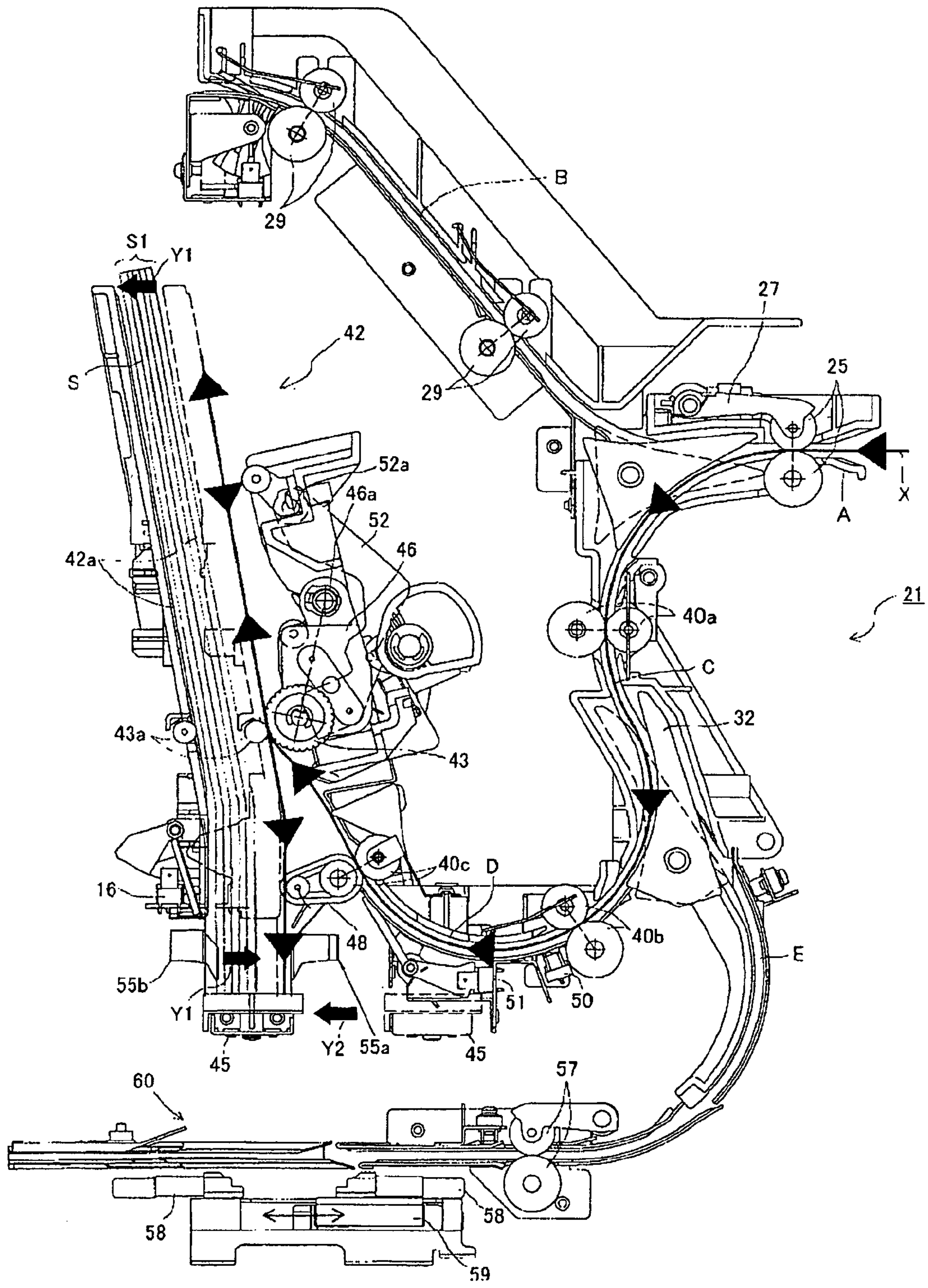
FIG. 2 is a sectional view of a transporting and aligning unit for transporting a sheet discharged to a collecting unit from a main unit of the image forming apparatus.

The transporting and alignment unit 21 comprises the first transport path A for transporting the sheet S from the apparatus main unit 2, the second and third transport paths B and C branched from the first transport path A into two paths, and the fourth and fifth transport paths D and E branched from the third transport path C into two paths. FIG. 2 shows the transporting and alignment unit 21 in detail. A pair of transport rollers 25 is provided in the first transport path A. A first switching flapper 27 is disposed at a downstream side of the transport rollers 25 at a branch portion of the second transport path B and third transport path C for switching the transport path. A second switching flapper 32 is disposed at a branch portion of the fourth transport path D and fifth transport path E for switching transport path.

In such a transport path configuration, when the normal discharge mode is selected on the apparatus main unit 2, the sheet S is transported into the sheet finishing apparatus 20 from the apparatus main unit 2 passing through the first transport path A. In this case, the sheet S is guided into the second transport path B with the first switching flapper 27, and is then discharged to the stacking tray 30 (see FIG. 1) using a plurality of pairs of transport rollers 29 disposed on the transport path B.

On the other hand, when the binding mode is selected on the apparatus main unit 2, the sheet S is guided to the third transport path C with the first switching flapper 27. Then, the second switching flapper 32 guides the sheet S to one of the fourth transport path D and the fifth transport path E. After a plurality of the sheets S is bound into a book (with an adhesive to bind the pages) at an adhesive dispensing unit 22 and cutting unit 23, the sheet bundle S is discharged to a stacking tray 35 (see FIG. 1). Note that the arrow X in FIG. 2 indicates a direction that the sheet S other than a cover sheet S0 is transported (see FIG. 8).

The paired transport rollers 40*a*, 40*b* and 40*c* are disposed along the third and fourth transport paths C and D for transporting the sheet S. A first trailing edge sensor 50 and a second trailing edge sensor 51 are disposed at predetermined positions between the paired transport rollers 40*b* and 40*c* in this order from an upstream side for detecting a trailing edge of the sheet S. A stacking unit 42 is disposed at a downstream side of the fourth transport path D for forming an alignment region of the transport alignment unit 21.

The stacking unit 42 is provided with a back plate 42*a* for receiving the sheet S on a back surface thereof and a reference plate (stacking plate) 45 for receiving the trailing edge of the sheet S on a bottom thereof. A predetermined number of the sheets S are stacked on the plates 42*a* and 45 substantially vertically to form a sheet bundle S1. In this case, the back plate 42*a* slides in a direction that the sheet S is stacked (a substantially horizontal direction indicated by the arrow Y1 in FIG. 2, or a thickness direction of the sheet bundle S1) through a sliding mechanism (not shown). It is possible to fix the plate 42*a* at an arbitrary position using a rack (not shown).

The reference plate 45 slides in a direction that the sheet S is stacked (substantially horizontal direction indicated by the arrow Y2 in FIG. 2, or thickness direction of the sheet bundle S1) between a stacking position (indicated by solid line in FIG. 2) for supporting the sheet S (sheet bundle S1) stacked on the stacking unit 42 from below and a retracted position (indicated by hidden line in FIG. 2) for releasing the sheet S by opening a bottom side of the stacking unit 42.

A pushing arm 52 is mounted to be rotatable around a rotating shaft 52*a* on the stacking unit 42 for pushing the sheet S against the back plate 42*a*. A stacking roller 43 capable of rotating in forward and reverse directions is arranged on the stacking unit 42 to face the back plate 42*a*. The stacking roller 43 is supported on one end of the arm 46 rotatably supported on the rotating shaft 46*a*. When the arm 46 rotates, the stacking roller 43 protrudes into the fourth transport path D to nip and transport the sheet S with the follower roller 43*a* disposed on the back plate 42*a*.

A caterpillar belt 48 for sweeping is arranged on a bottom side of the stacking roller 43 for transporting the sheet S stacked on the stacking unit 42 toward the reference plate 45 in cooperation with the stacking roller 43. A pair of grippers (support means) 55*a* and 55*b* as grip members is disposed on a bottom side of the back plate 42*a* for holding the sheet S stacked substantially vertically in the stacking unit 42 and for moving the sheet S downwardly toward the adhesive dispensing unit 22 and cutting unit 23 while maintaining the substantially vertical state (with an edge of the sheet bundle S1 as a leading edge).

The grippers 55*a* and 55*b* move in a substantially vertical direction (ascending and descending operation) between a holding position where they hold the sheet bundle S1 between the back plate 42*a*, and the reference plate 45 and a hand-over position where they hand over the sheet bundle S1 to the cutting device. The grippers 55*a* and 55*b* also move substantially horizontally (thickness direction of the sheet bundle S1) between a closed position (indicated in FIG. 2) for nipping the sheet bundle S1 from both sides and an opened position for releasing the sheet bundle S1. In this embodiment, the sliding gripper 55*b* is arranged to move toward the fixed gripper 55*a* at the other side to move between the opened and closed positions (opening and closing operation). A sheet sensor 16 is disposed on the stacking unit 42*b* for detecting the sheet S on the stacking unit 42.

A process of stacking the sheets S using the stacking unit 42 to form the sheet bundle S1 will be explained next. When a binding mode is selected on the apparatus main unit 2, the sheet S is discharged from the apparatus main unit 2, and is guided sequentially from the first transport path A via the pair of transport rollers 25 and the first switching flapper 27 into the third transport path C. Then, the sheet S is led to the stacking unit 42 from the fourth transport path D via the second switching flapper 32. When the first trailing edge sensor 50 detects the trailing edge of the sheet S, the arm 46 rotates so that the stacking roller 43 protrudes into the fourth transport path D to face the follower rollers 43*a*.

At this time, the stacking roller 43 rotates in the forward direction to feed the sheet S nipped with the follower rollers 43*a* to the back plate 42*a*. When the trailing edge of the sheet S is detected by the second trailing edge sensor 51, the stacking roller 43 starts to rotate in the reverse direction at a predetermined timing. The sheet S is supported on the back surface of the back plate 42*a* toward the reference plate 45 using the stacking roller 43 rotating in reverse and the caterpillar belt 48. In other words, the sheet S transported to the stacking unit 42 is held temporarily on the back plate 42*a*, and is then returned to the reference plate 45. The trailing edge of the sheet S is aligned in the transport direction by abutting the reference plate 45. Note that a part of the sheet bundle S1 formed of the aligned trailing edge of the sheets S is called an edge of the sheet bundle.

In this way, each time the sheet S is stacked on the reference plate (when the trailing edge of the sheet S contacts the reference plate 45), the pushing arm 52 rotates around the rotating shaft 52*a* to press the sheet S against the back plate 42*a*. When the pushing arm 52 presses the sheet S, gaps between the sheets S are eliminated to form the sheet bundle S1 in an appropriate form, and the back plate 42*a* slides with the sheet bundle S1. The back plate 42*a* slides to a position fixed by the rack mechanism, thereby ensuring a space for stacking the next sheet S. Specifically, the pushing arm 52 slides the back plate 42*a* as the number of the sheet S stacked on the stacking unit 42 increases (to correspond to a thickness of the sheet bundle S1), thereby forming the sheet bundle S1 in a well-aligned state.

As described above, the sheets S are fed sequentially to the stacking unit 42. When a predetermined number of the sheets S are stacked (when a predetermined thickness of sheet bundle S1 is formed), i.e. the back plate 42 slides by a predetermined amount, the back plate 42*a* is released from the rack and is urged to move toward the stacking roller 43 by an urging member (not shown), so that the back plate 42*a* and the stacking roller 43 nip the sheet bundle S1. In the configuration described above, the sheets S are transported to the stacking unit 42 to form the sheet bundle S1. It is also acceptable to transport the sheet bundle having a predetermined number of the sheets to the stacking unit 42 to form the sheet bundle S1 with a predetermined thickness.

The sheet bundle S1 thus formed is held by the grippers 55*a* and 55*b* idling at the opened position, and is then moved toward the adhesive dispensing unit 22. The adhesive dispensing unit 22 (not shown in FIG. 2) is disposed between a cover adhesion unit 60 (described later) at a downstream side of the fifth transport path E and the reference plate 45 (see FIG. 1).

Figure 3:
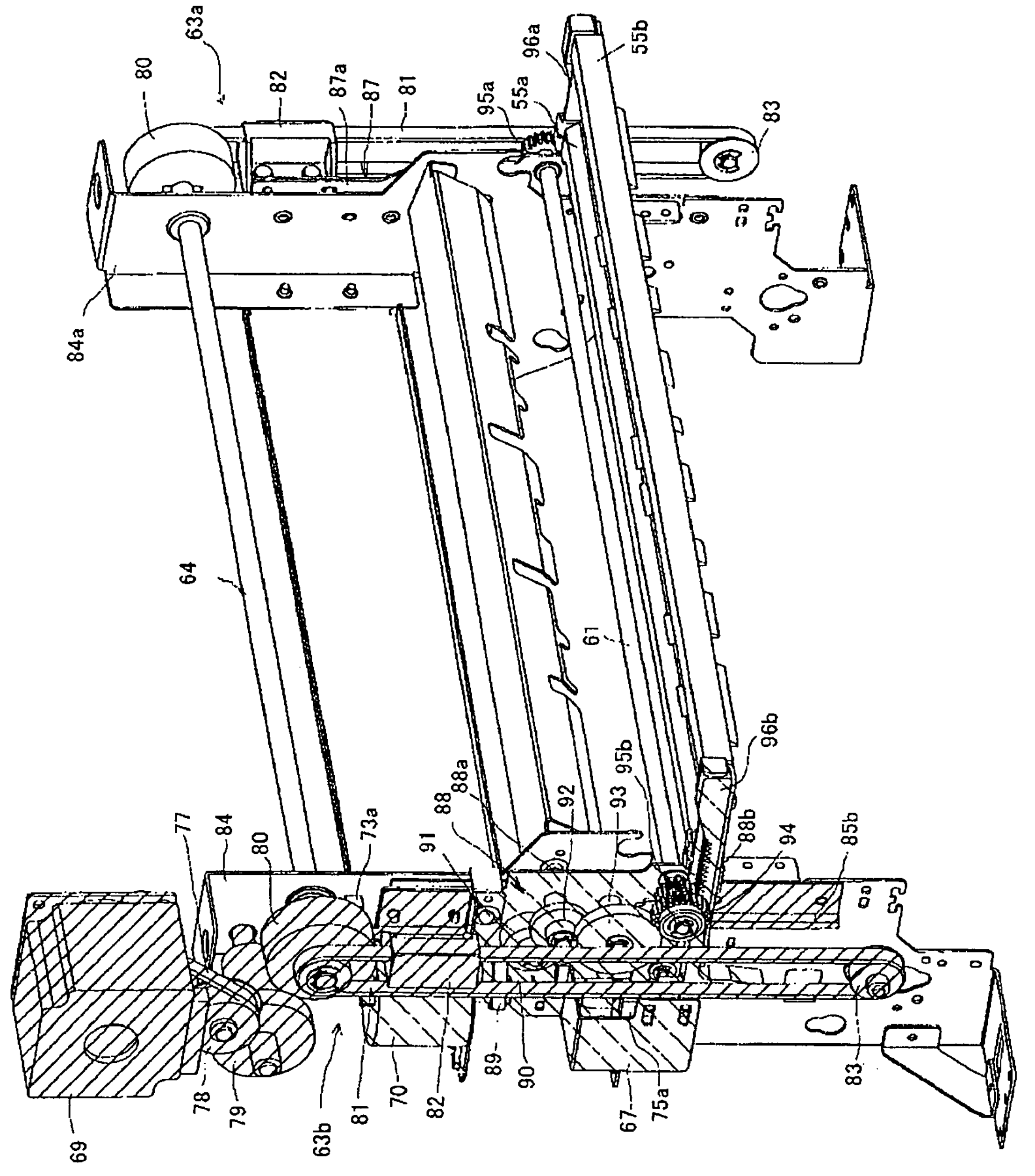
FIG. 3 is a perspective view of an opening and closing mechanism and ascending and descending mechanism of grippers.
Figure 4:
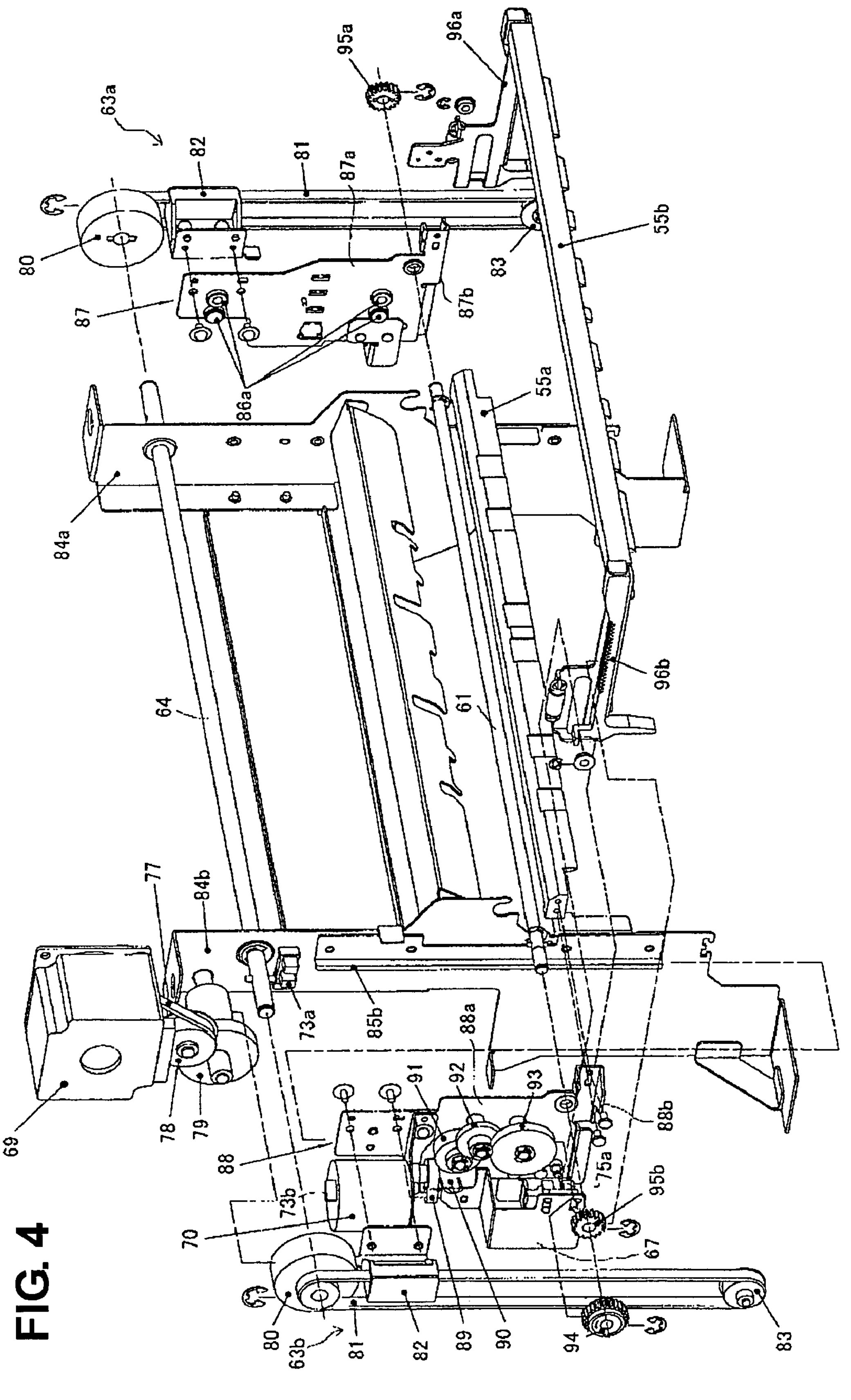
FIG. 4 is an exploded perspective view of the opening and closing mechanism and ascending and descending mechanism of the grippers.
Figure 15:
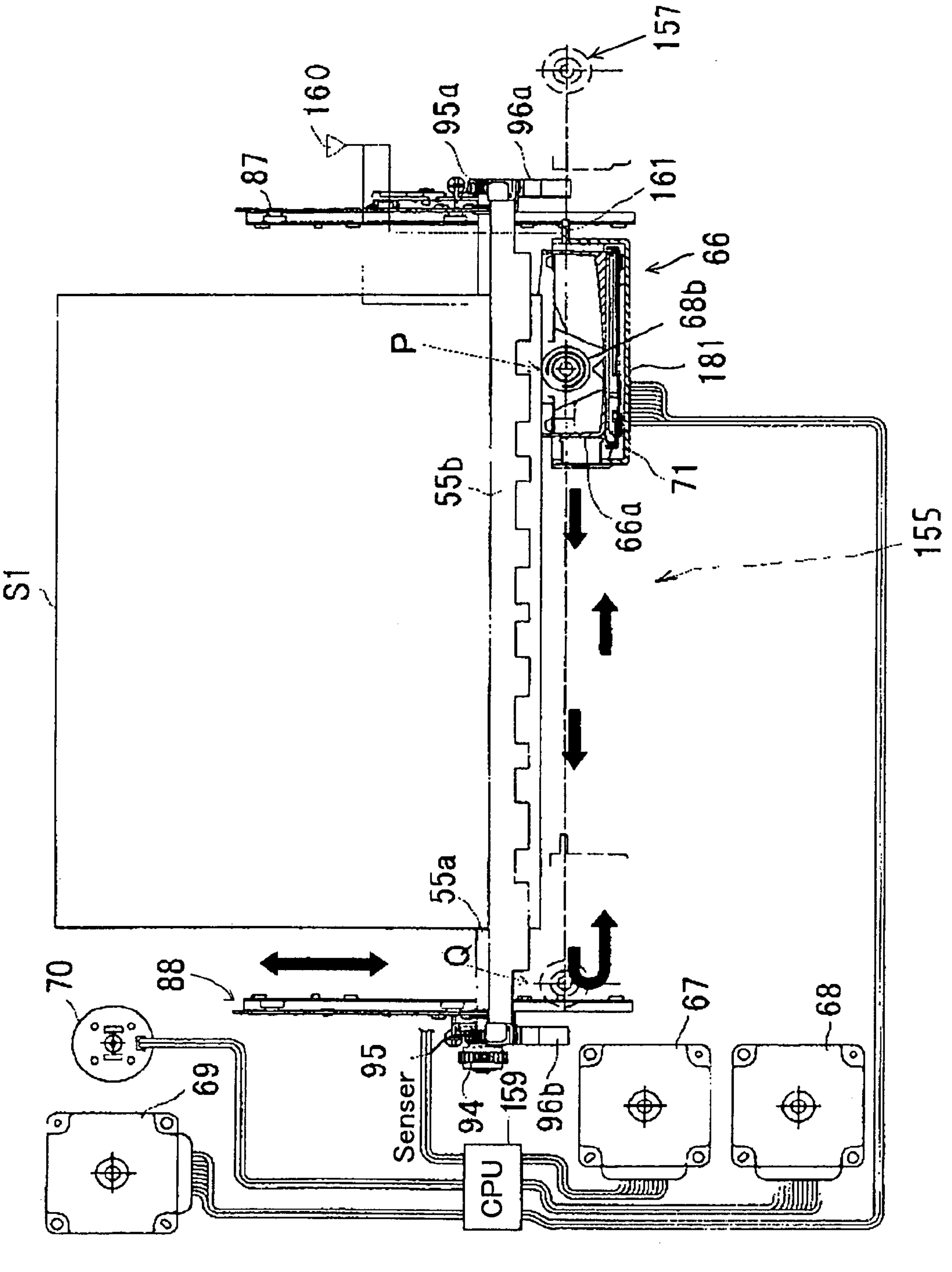
FIG. 15 is a view showing an electrical circuit and a positional relationship between a sheet bundle and the adhesive unit in an adhesive dispensing unit (in a state that the adhesive unit is positioned at a dispensing area)
Figure 16:
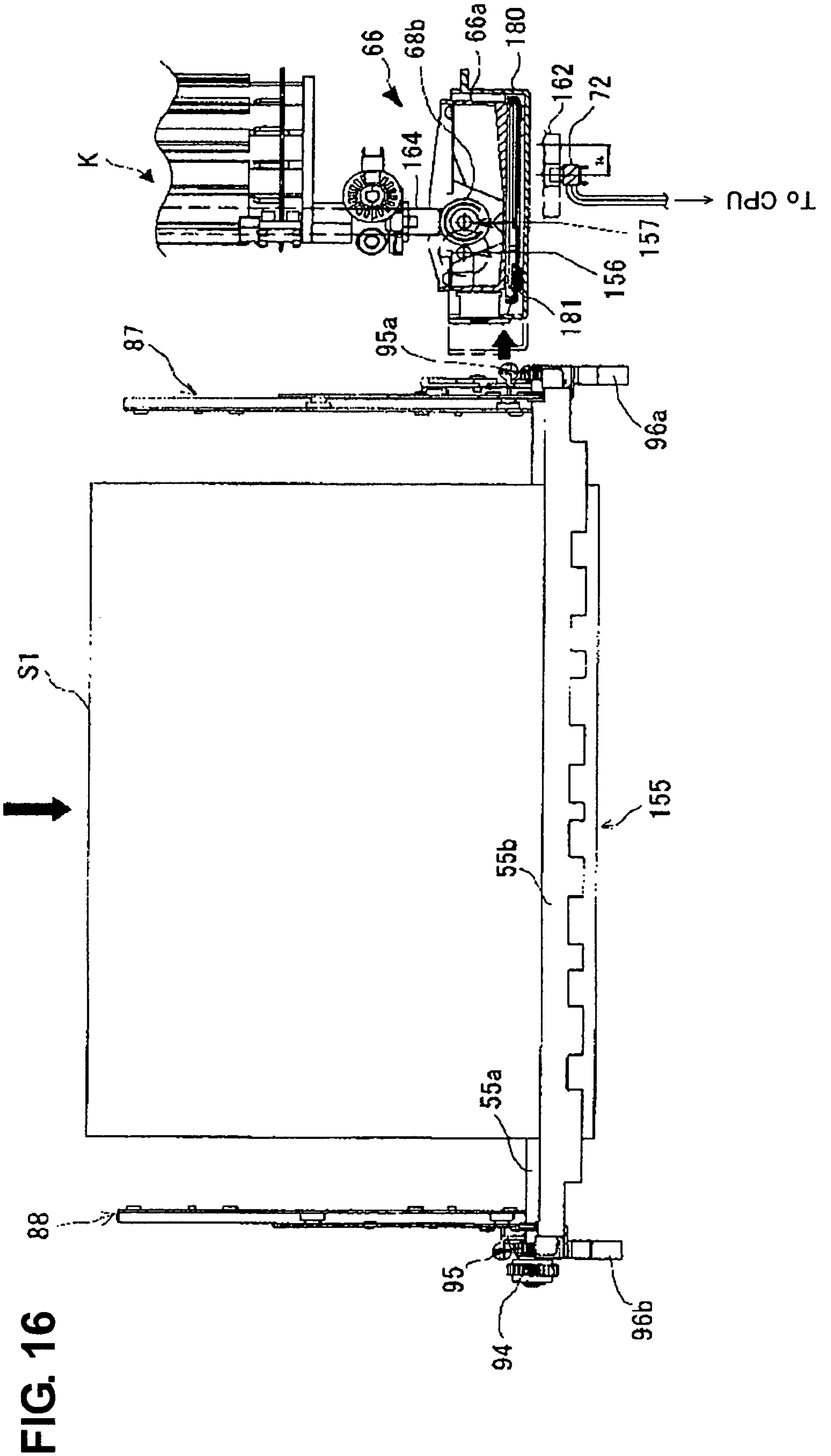
FIG. 16 is a view showing a positional relationship between the sheet bundle and the adhesive unit in the adhesive dispensing unit (in a state that the adhesive unit is positioned at a refilling position)

The grippers 55*a* and 55*b* and a drive mechanism thereof will be explained in detail next. As shown in FIGS. 15 and 16, the grippers 55*a* and 55*b* extend in a width direction of the sheet S stacked on the stacking unit 42, and are mounted to a pair of gripper units 87 and 88. As shown in FIGS. 3 and 4, the gripper units 87 and 88 have first and second base plates 87*a* and 88*a*. One end of the fixed gripper 55*a* is attached to the first base plate 87*a* and the other end of the fixed gripper 55*a* is attached to the second base plate 88*a*. The slide gripper 55*b* has racks 96*a* and 96*b* at both ends thereof. The racks 96*a* and 96*b* are slidably mounted to the guide rails 87*b* and 88*b* on the base plates 87*a* and 88*a*.

A motor 70 is mounted to the second base plate 88*a* for opening and closing the grippers, and a motor gear 89 is fastened to an output shaft of the motor 70. Rotatably mounted on a surface of the second base plate 88*a* are a worm gear 90 engaging the motor gear 89, a first gear 91 engaging the worm gear 90, a second gear 92 engaging the first gear 91, and a third gear 93 engaging the second gear 92. Note that the gripper opening and closing motor 70 is connected to a CPU 159 as a control means (see FIG. 15). The CPU 159 controls a drive of the gripper opening and closing motor 70.

The base plates 87*a* and 88*a* support a rotating shaft 61 therebetween to be rotatable. A one-way gear 94 engaging the third gear 93 and a pinion gear 95*b* engaging the rack 96*b* at one side of the slide gripper 55*b* are disposed on one side of the rotating shaft 61 supported by the second base plate 88*a*. The pinion gear 95*a* engaging the rack 96*a* of the slide gripper 55*a* is fastened to the other side of the rotating shaft 61 supported by the first base plate 87*a*.

With this configuration, the gripper units 87 and 88 support the grippers 55*a* and 55*b* via the rack and pinion mechanism. The units 87 and 88 comprise a gripper opening and closing mechanism (indicated by projected line in FIG. 3), so that the gripper opening and closing motor 70 drives the rack and pinion mechanism through a series of the gears for opening and closing the grippers 55*a* and 55*b*.

Figure 6:
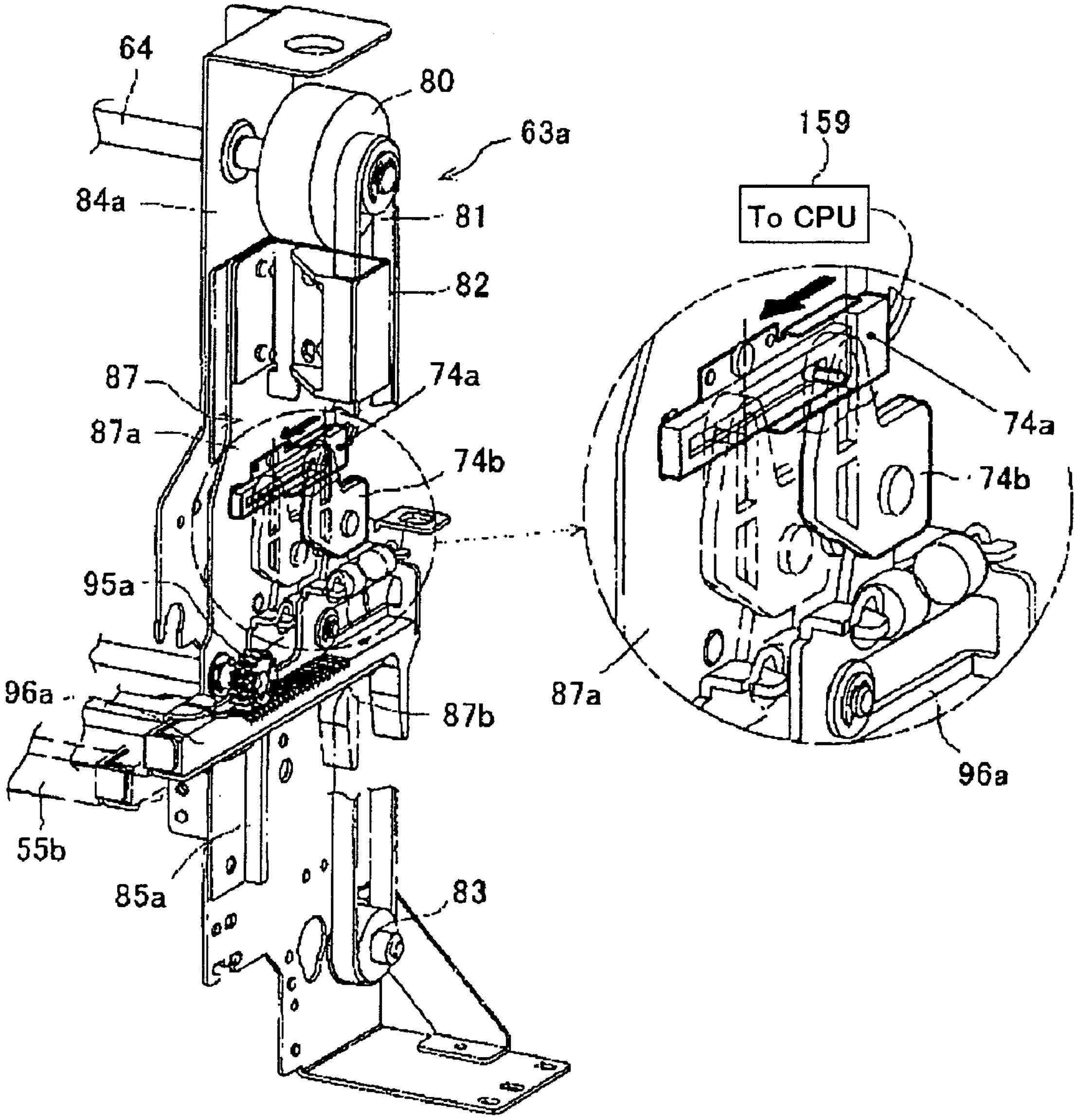
FIG. 6 is a perspective view of one side of the opening and closing mechanism of the grippers.

In this embodiment of the present invention, detecting means is provided for detecting a thickness of the sheet bundle S1 stacked on the stacking unit 42 using the opening and closing mechanism. As shown in FIG. 6, the detection means is composed of an opening amount sensor flag 74*b* formed on the rack 96*a* and a gripper opening amount detection sensor 74*a* disposed on the first base plate 87*a*. The opening amount sensor flag 74*b* moves along with the rack 96*a* (slide gripper 55*b*), and a gripper opening amount detection sensor 74*a* detects the opening amount sensor flag 74*b* to determine the thickness of the sheet bundle S1 nipped between the grippers 55*a* and 55*b*. A signal detected by the gripper opening amount detection sensor 74*a* is sent to the CPU 159.

Figure 7:
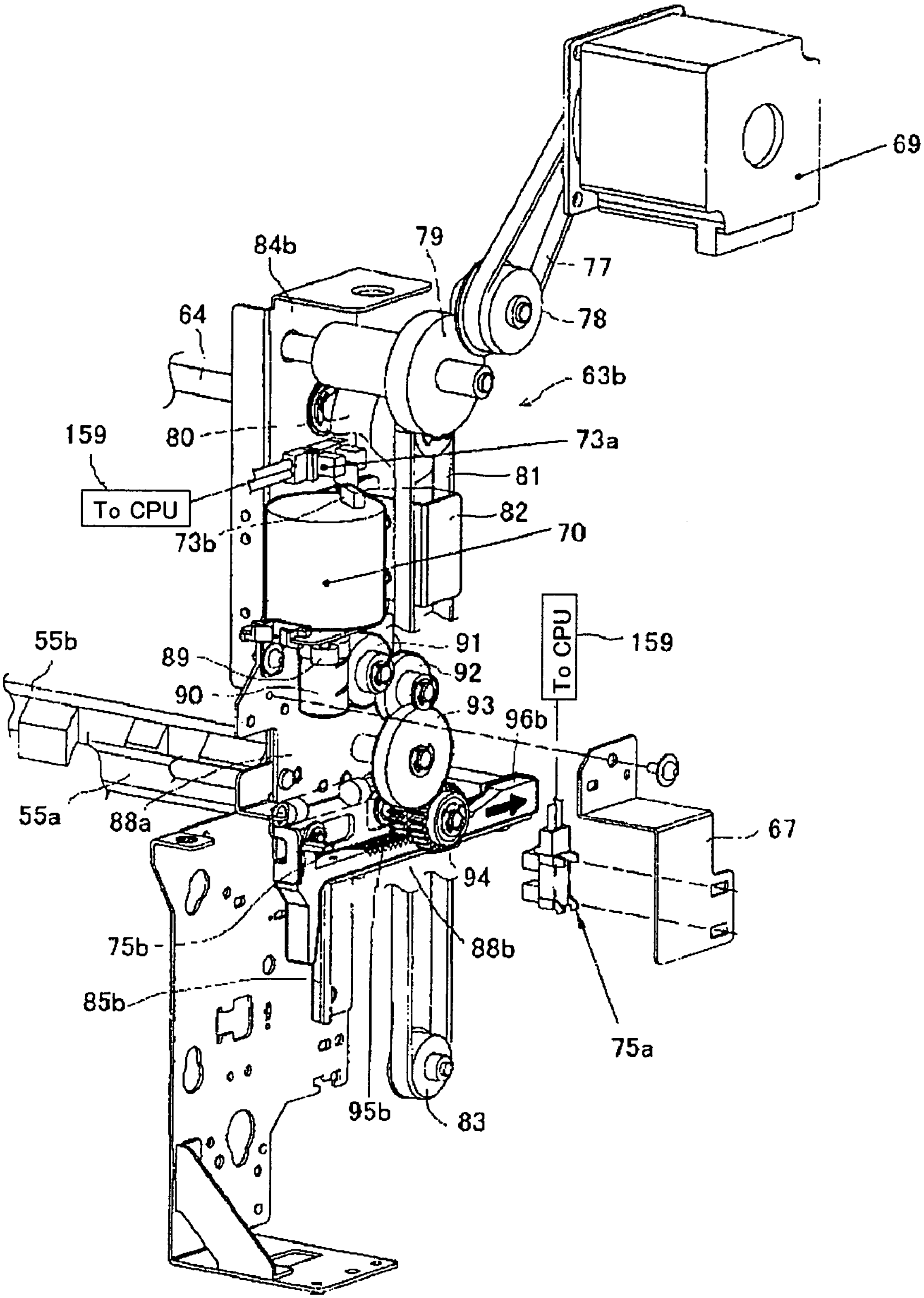
FIG. 7 is a perspective view of the other side of the opening and closing mechanism of the grippers.

Also, in this embodiment of the present invention, a safety mechanism is disposed for preventing the slide gripper 55*b* from moving excessively. As shown in FIG. 7, the safety mechanism is composed of an opening limit detection sensor flag 75*b* formed on the rack 96*b* and a gripper opening limit detection sensor 75*a* fastened to the mounting plate 67 mounted on the second base plate 88*a* at a predetermined position. When the detection sensor 75*a* detects the sensor flag 75*b* moving along with the rack 96*b* (slide gripper 55*b*) at an opening limit position, the detection sensor 75*a* sends a detection signal to the CPU 159. The CPU 159 stops the gripper opening and closing motor 70 based on the detection signal to regulate a further movement of the slide gripper 55*b*. With the safety mechanism, it is possible to limit the racks 96*a* and 96*b* to move within a limit L (see FIG. 8), so that the slide gripper 55*b* is not damaged through an excessive movement due to a malfunction of the motor 70.

The gripper units 87 and 88 are mounted to support plates 84*a* and 84*b* fastened to a main unit of the sheet processing apparatus 20 to be slidable in a vertical direction. Specifically, the gripper units 87 and 88 slidably engage guide rails 85*a* and 85*b* disposed on the support plate 84*a* and 84*b* and extending in the vertical direction, and are fixed to ascending and descending mechanisms 63*a* and 63*b* disposed on the support plates 84*a* and 84*b* (see FIG. 5 and FIG. 6).

Figure 5:
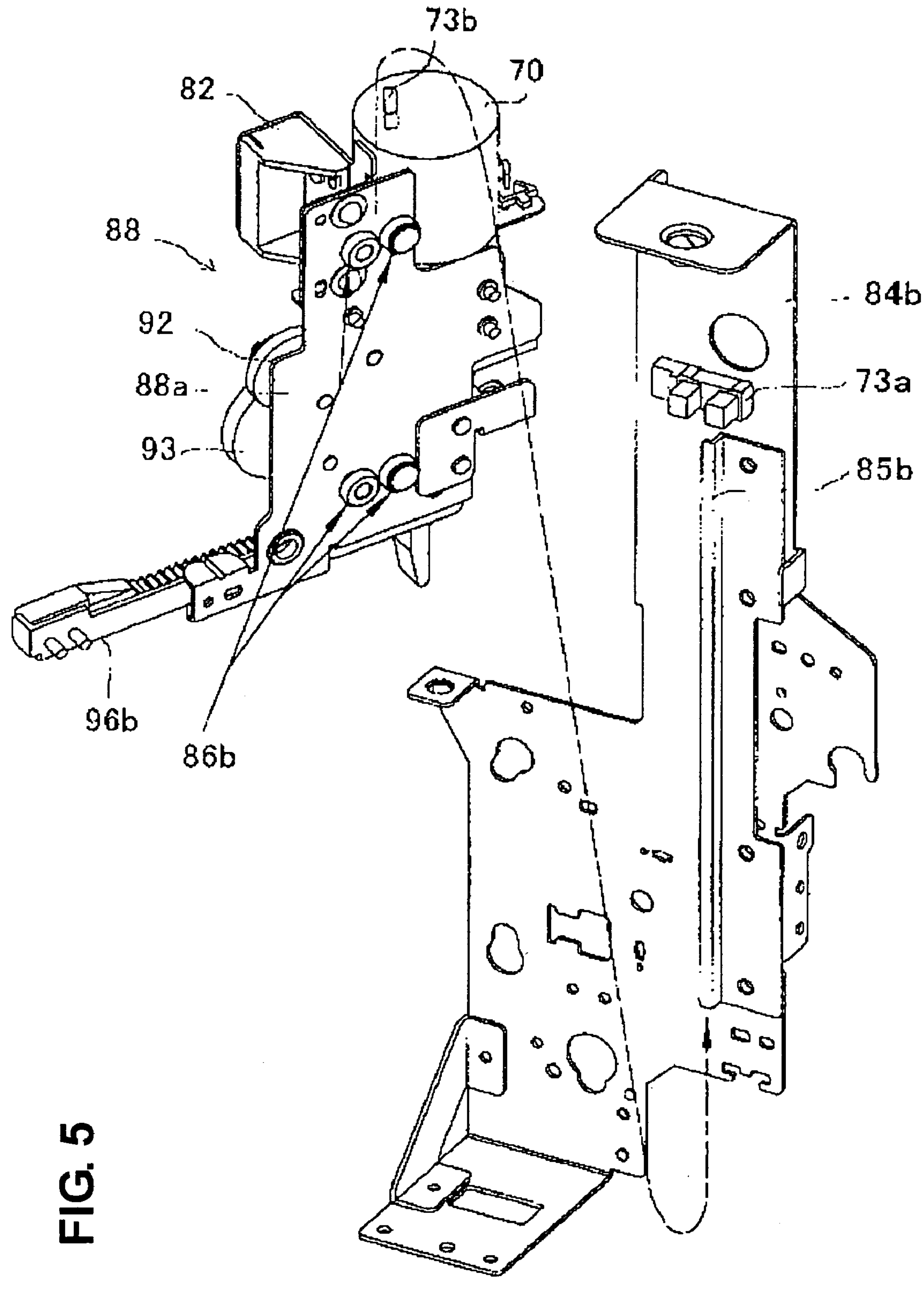
FIG. 5 is a perspective view showing a gripper unit and a support plate in a slidably connected state.

As shown in FIG. 4 and FIG. 5, the gripper units 87 and 88 engage the guide rails 85*a* and 85*b* through guide rollers 86*a* and 86*b* mounted on backsides of the base plates 87*a* and 88*a* of the gripper units 87 and 88. In the embodiment of the present invention, two pairs of the guide rollers 86*a* and 86*b* are mounted on the backside of the base plate 87*a* and 88*a* at upper and lower locations, and the guide rails 85*a* and 85*b* are sandwiched between the pairs of the guide rollers 86*a* and 86*b*.

Each of the ascending and descending mechanisms 63*a* and 63*b* is composed of a gear pulley 80 and a tension pulley 83 rotatably mounted on each of the support shafts 84*a* and 84*b* at upper and lower locations, an endless drive belt 81 placed between the pulleys 80 and 83, and a joint 82 fixed to the drive belt 81 and to each of the base plates 87*a* and 88*a* of the gripper units 87 and 88. The gear pulleys 80 of the ascending and descending mechanisms 63*a* and 63*b* are fixed to both ends of the rotating shaft 64 rotatably supported on the support plates 84*a* and 84*b*.

Figure 9:
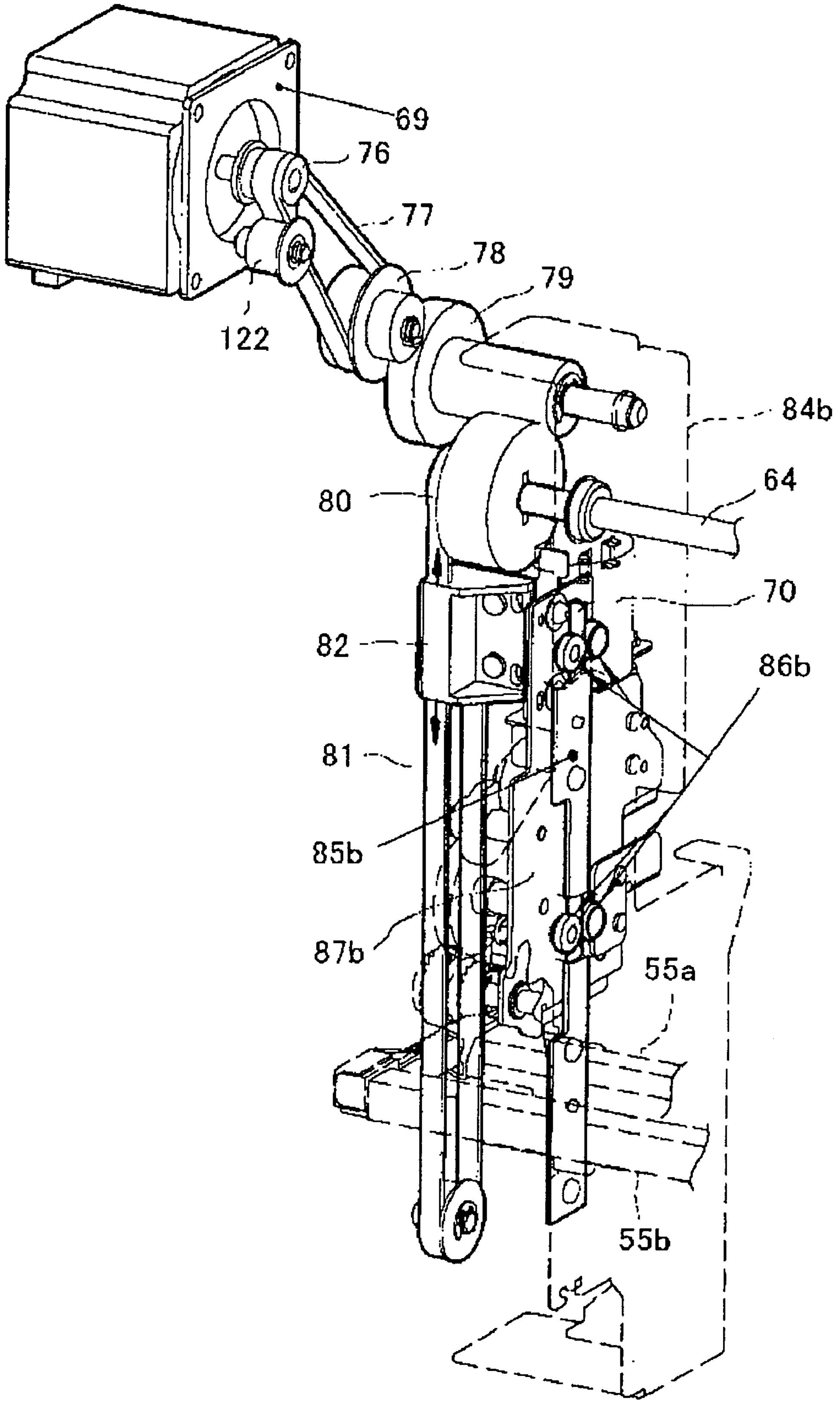
FIG. 9 is a perspective view of one side of the ascending and descending mechanism of the grippers.

A gripper ascending and descending motor 69 transmits a drive to the ascending and descending mechanisms 63*a* and 63*b* through a series of gears. As shown in FIG. 9, a motor pulley 76 is mounted to an output shaft of the motor 69, and a drive belt 77 is placed between the motor pulley 76 and a gear pulley 78 mounted at a predetermined position. A tension roller 122 is pressed against the drive belt 77 to apply a constant tension thereto. The gear pulley 78 engages a gear 79 rotatably mounted to the support plate 84*b*. The gear 79 engages a gear pulley 80 on the ascending and descending mechanism 63*b*, so that the drive of the motor 69 is transmitted to each of the ascending and descending mechanisms 63*a* and 63*b* (transmitted to the ascending and descending mechanism 63*a* through a rotating shaft 64). In FIG. 3, the ascending and descending mechanism 63*b* and the drive mechanism thereof are indicated by cross solid line (oblique line).

The CPU 159 controls the ascending and descending mechanisms 63*a* and 63*b* to ascend and descend the gripper units 87 and 88 (grippers 55*a* and 55*b*) according to the detected positions of the gripper units 87 and 88. As shown in FIG. 7, a gripper up/down HP sensor 73*a* is disposed on the support plate 84*b* at a predetermined position for detecting an up/down sensor flag 73*b* on the gripper opening and closing motor 70. The sensor 73*a* sends detection information to the CPU 159 to control the gripper ascending and descending movement motor 69 (see FIG. 15). In this embodiment, through the control described above, the grippers 55*a* and 55*b* are controlled to move vertically within H (see FIG. 8).

In the configuration of the ascending and descending, and opening and closing mechanisms (sheet bundle moving means or transport means), the grippers 55*a* and 55*b* open and close, and ascend and descend in the following manner. First, as described above, when the sheet bundle S1 is formed on the stacking unit 42, the CPU 159 drives the gripper opening and closing motor 70. The pinion gears 95*a* and 95*b* are rotated through the gears of 89, 90, 91, 92, 93 and 94 in the opening and closing mechanisms to move the racks 96*a* and 96*b* engaging the pinion gears 95*a* and 95*b* from the position indicated by hidden line in FIG. 6 and FIG. 8 to the position indicated by solid line (direction opposite to the direction indicated by the arrows in FIG. 7 and FIG. 8). As a result, the sliding gripper 55*b* idling at the opened position (position indicated by hidden line in FIG. 6) closes toward the sheet bundle S1, and the grippers 55*a* and 55*b* nip the sheet bundle S1. At this time, the opening amount sensor flag 74*b* and gripper opening amount detection sensor 74*a* moving along with the rack 96*a* (slide gripper 56*b*) determine a thickness of the sheet bundle S1 nipped between the grippers 55*a* and 55*b*.

Figure 10:
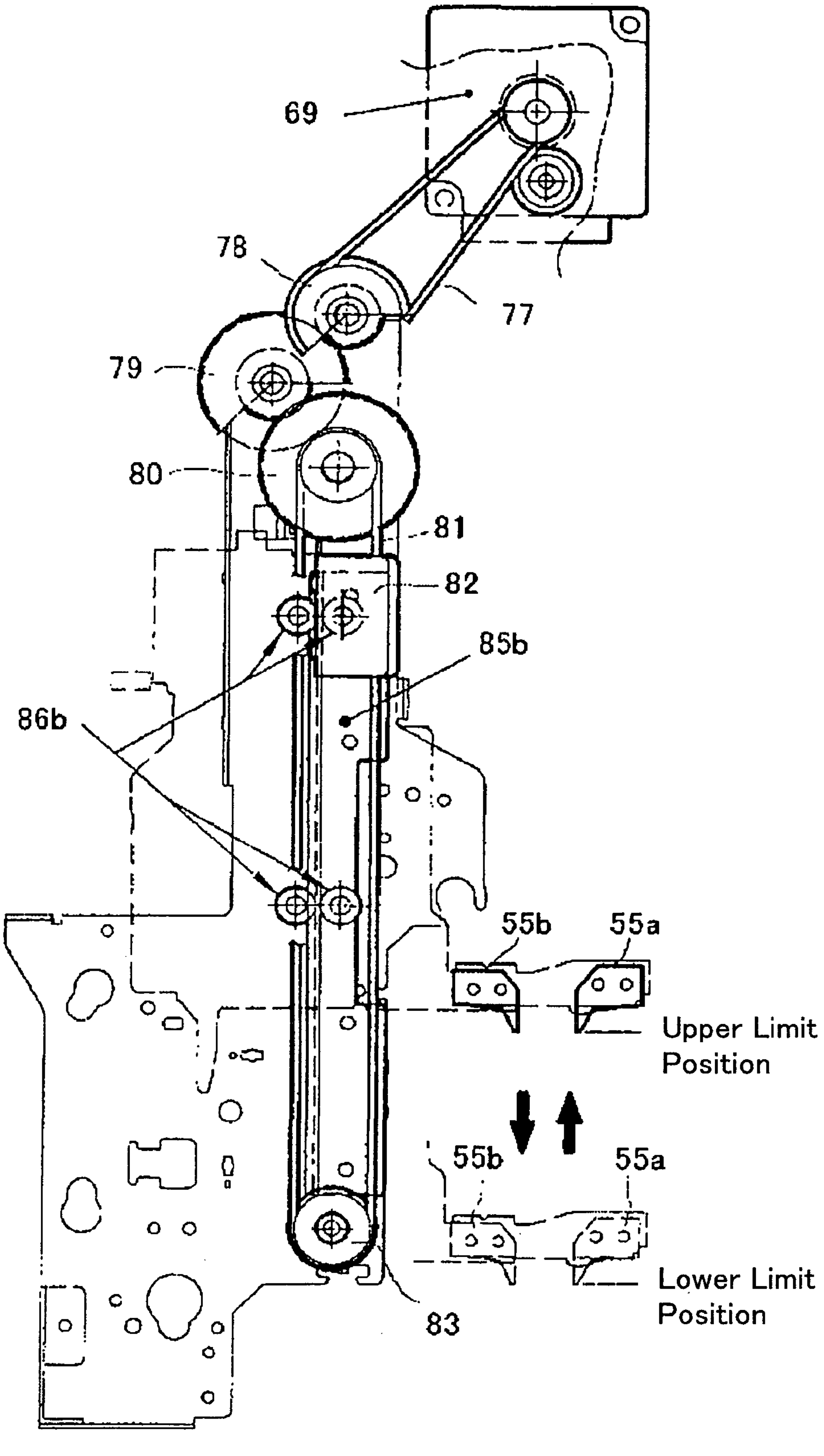
FIG. 10 is a side view of the one side of the ascending and descending mechanism of the grippers.

When the sheet bundle S1 is nipped by the grippers 55*a* and 55*b*, the reference plate 45 slides from the stacking position (position indicated by solid line in FIG. 2) to the retracted position (position indicated by hidden line in FIG. 2) to form a transport path for the sheet bundle S1. In this state, the CPU 159 drives the gripper ascending and descending movement motor 69 through the drive mechanism described above and the pulleys and the belts 76, 77, 78, 79, 80 and 81 in the ascending and descending mechanisms 63*a* and 63*b*, so that the gripper units 87 and 88 (grippers 55*a* and 55*b*) are lowered toward the adhesive dispensing unit 22 (see the arrows in FIG. 9 and in FIG. 10). The CPU 159 controls the ascending and descending of the gripper units 87 and 88 based on the detected positions of the gripper units 87 and 88 via the sensor 73*a* and flag 73*b* described above.

The adhesive dispensing unit 22 will be explained in detail next with reference to FIG. 11(*a*) to FIG. 17. The adhesive dispensing unit 22 comprises an adhesive unit 66 for holding an adhesive b (for example glue) and for dispensing the adhesive b to the edge of the sheet bundle S as dispensing means (see FIGS. 11(*a*) to 11(*c*)); a movement mechanism (moving means) for moving the adhesive unit 66 along the edge of the sheet bundle S1; and roller drive means for driving a dispense roller 68*b* (described later) in the adhesive unit 66 to rotate.

Figure 11A:
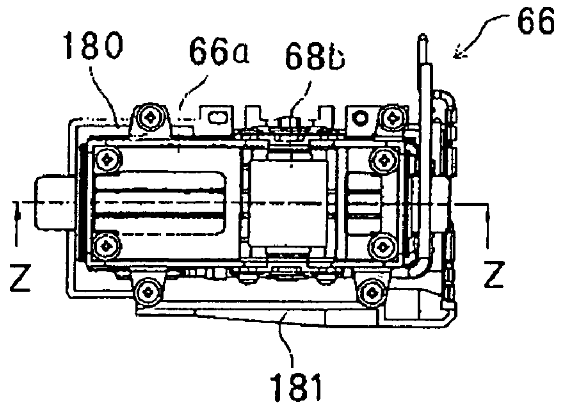
FIGS. 11(*a*) to 11(*c*) are views showing an adhesive unit, wherein FIG. 11(*a*) is a plan view thereof, FIG. 11(*b*) is a sectional view taken along line 11(*b*)-11(*b*) in FIG. 11(*a*), and FIG. 11(*c*) is an exploded perspective view thereof.
Figure 11B:
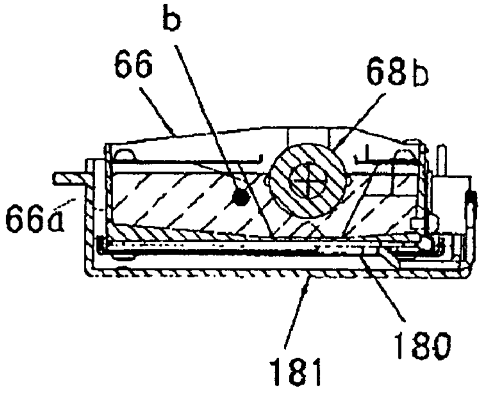
Figure 11C:
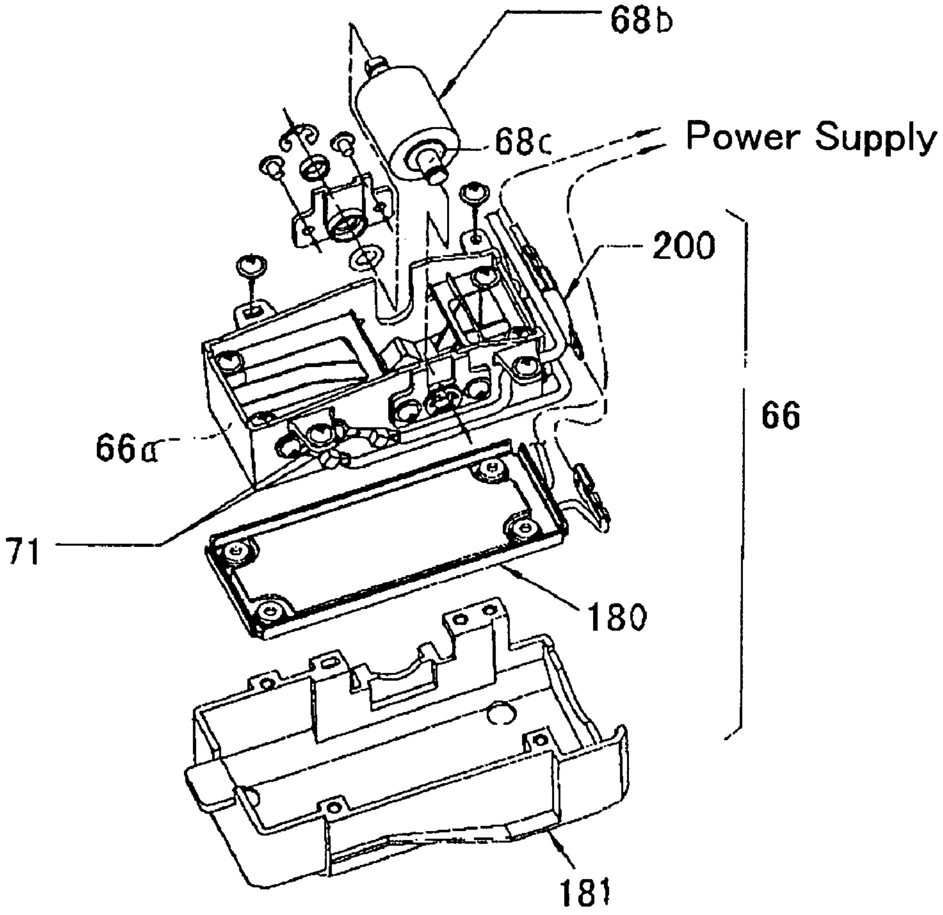

As shown in FIGS. 11(*a*) to 11(*c*), the adhesive unit 66 comprises a container (adhesive storage container) 66*a* formed of, for example, aluminum for storing an adhesive b; the dispense roller (dispensing means) 68*b* as a rotating body rotatably supported on the container 66*a* through a rotating shaft 68*c* formed of, for example, aluminum; a heater unit 180 detachably disposed on a bottom of the container 66*a* for melting the adhesive b in the container 66*a* by applying heat as melting means; and a thermal insulation cover 181 formed of a heat resistant resin for receiving the heat from container 66*a* and heater unit 180 from below and side for insulation.

In this case, the dispense roller 68*b* is formed of a heat resistance rubber, and holds the adhesive b in the container 66*a* on a surface thereof. The dispense roller 68*b* dispenses the adhesive b to the edge of the sheet bundle S while rotating. The heater unit 180 is connected to a power supply (not shown).

A temperature sensor 71 is disposed in the container 66*a* for detecting a temperature of the adhesive b in the container 66*a*. As shown in FIG. 15, the temperature sensor 71 is electrically connected to CPU 159 for sending a detection signal of the temperature of the adhesive to the CPU 159.

The CPU 159 controls the power supply to supply an electrical current to the heater unit based on the detection signal from the temperature sensor 71. A power supply line from the power supply to the heater unit is provided with a fuse 200 to prevent an excess electrical current.

Figure 12:
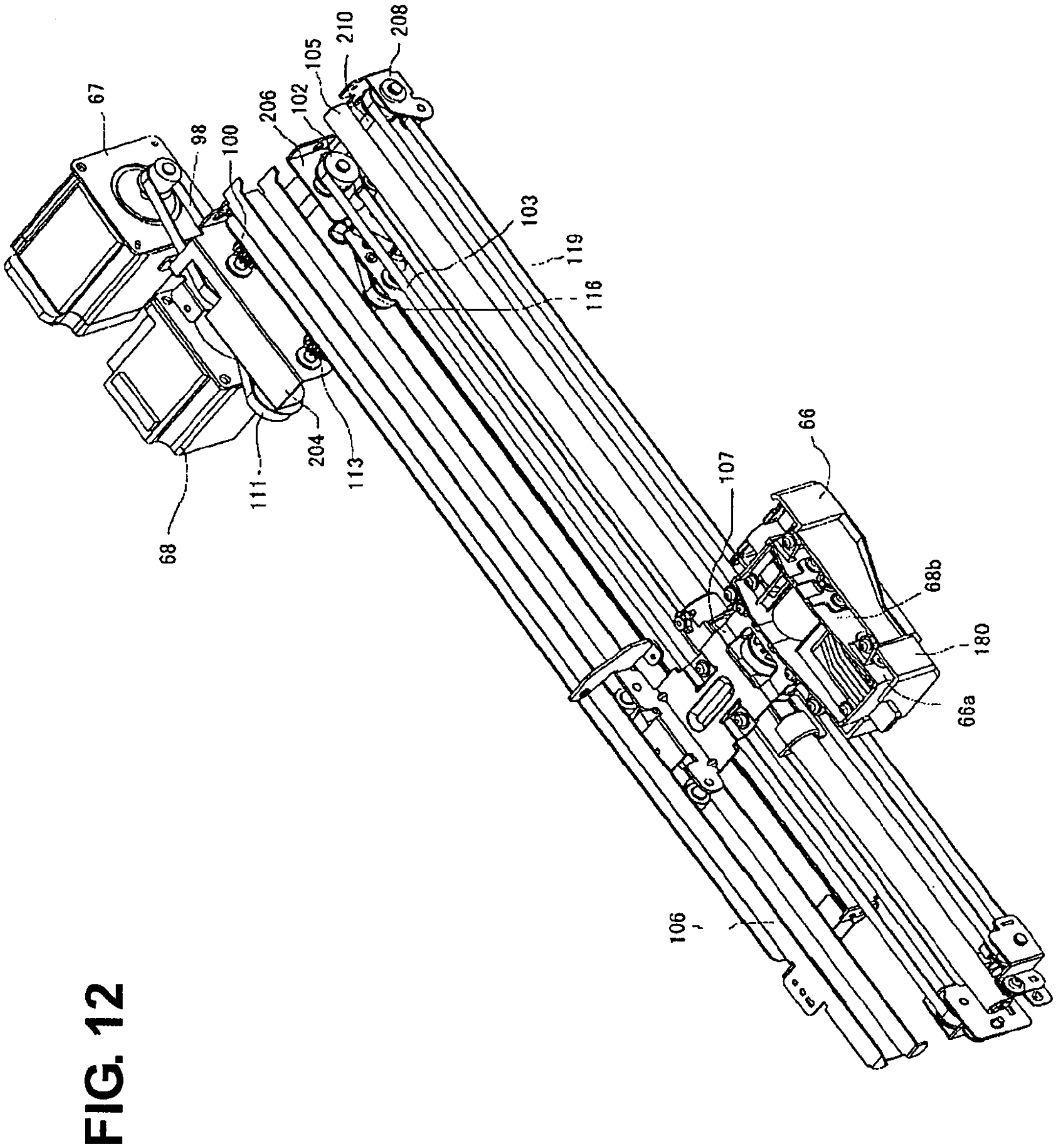
FIG. 12 is a perspective view of a movement mechanism for moving the adhesive unit and a drive mechanism for rotating a dispense roller.
Figure 13:
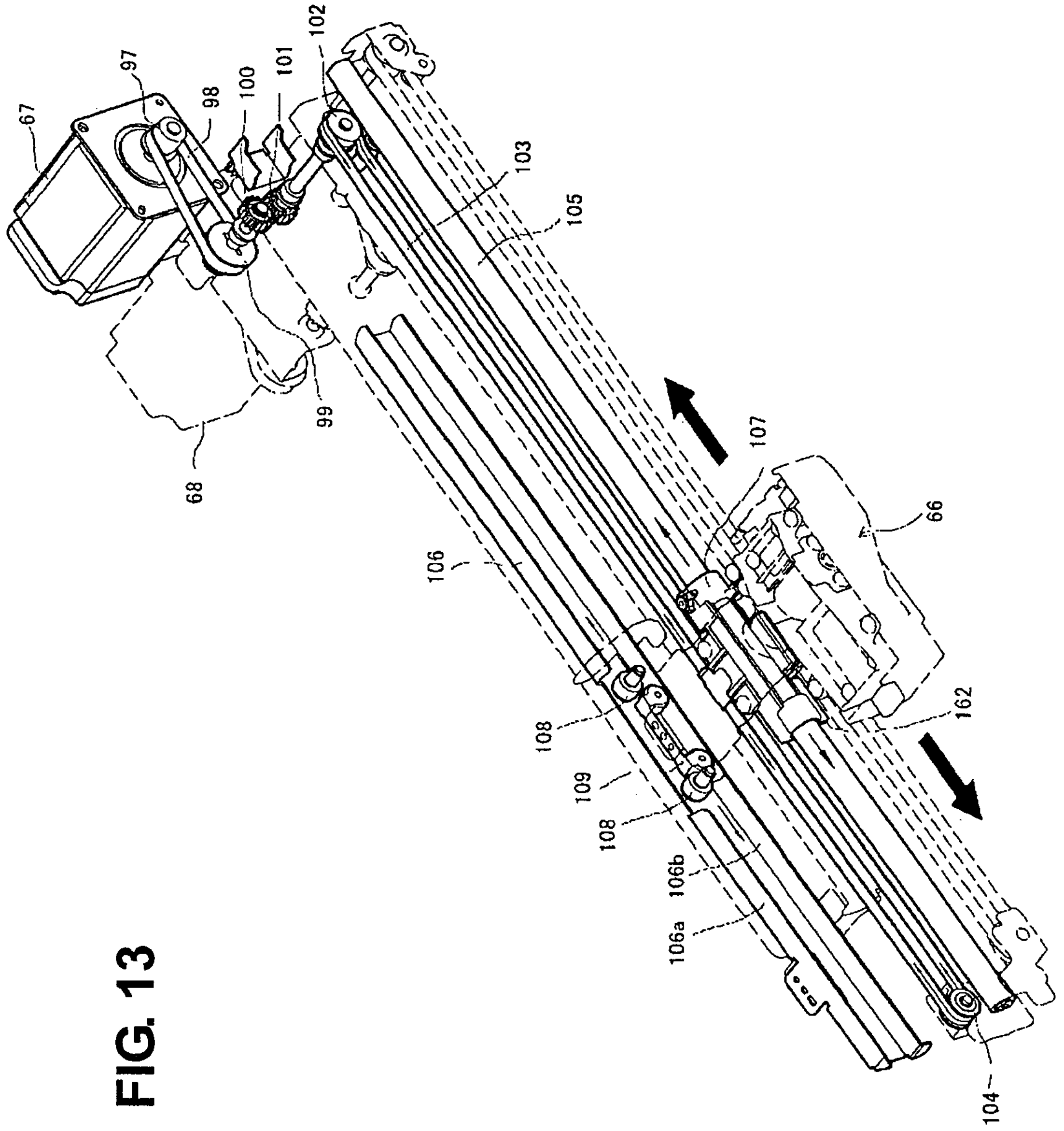
FIG. 13 is a perspective view mainly showing the movement mechanism for moving the adhesive unit.
Figure 14:
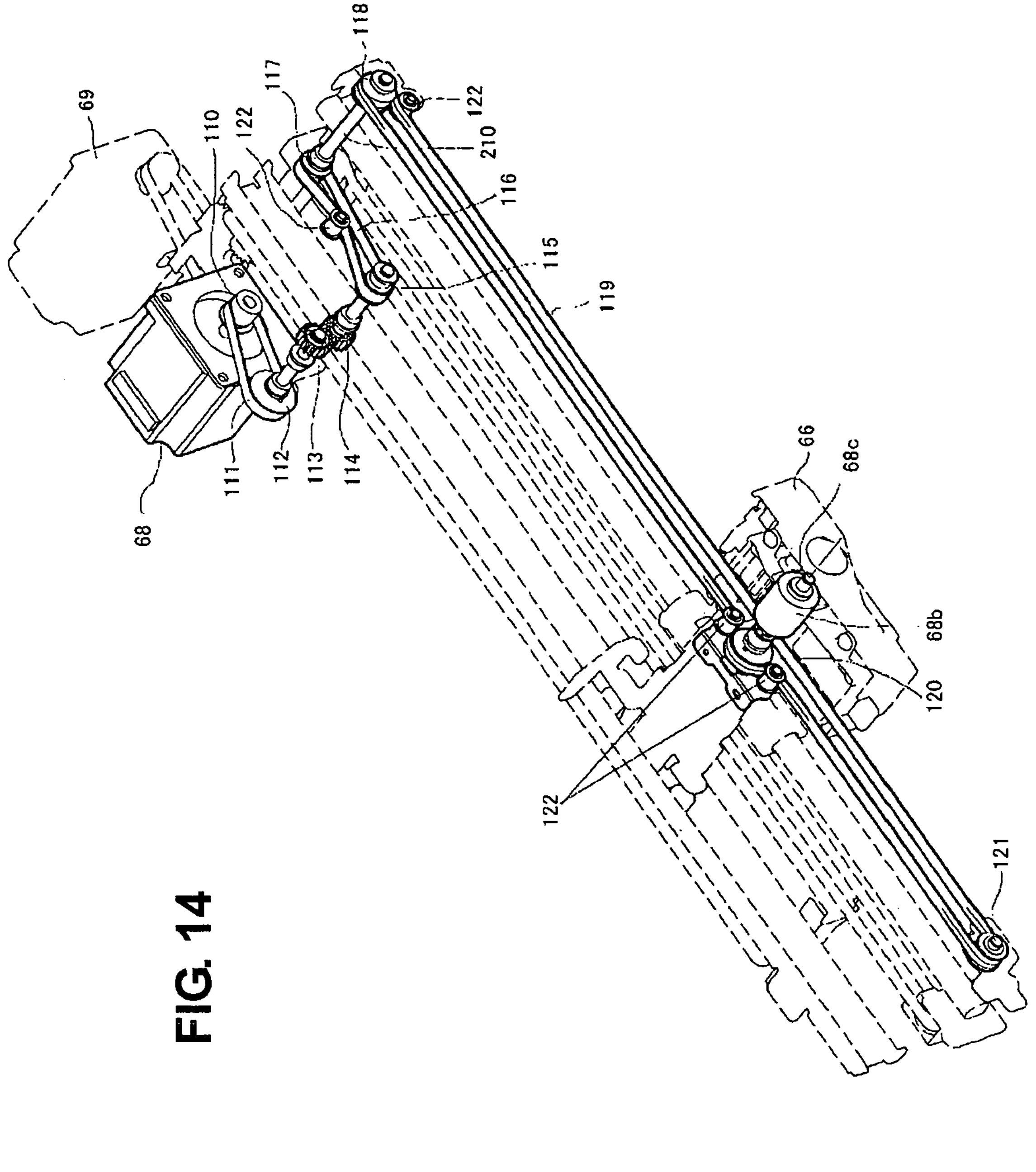
FIG. 14 is a perspective view mainly showing the drive mechanism for rotating the dispense roller.

As shown in FIG. 12 to FIG. 14, the movement mechanism moves (slides) the adhesive unit 66 along the edge of the sheet bundle S1, and the roller drive mechanism drives the dispense roller 68*b* to rotate. As shown in FIG. 12 and in FIG. 13, the movement mechanism comprises a container movement motor 67; a motor pulley 97 fixed to an output shaft of the container movement motor 67; a pulley 99 rotatably supported on the first support frame 204 fixed at a predetermined position; a drive belt 98 placed between the pulleys 97 and 99; a first gear 100 rotating as one body with the pulley 99; a second gear 101 rotatably supported on the second support frame 205 fixed at a predetermined position for engaging the first gear 100; a pulley 102 supported by the second support frame 206 and rotating as one body with the second gear 101; a tension pulley 104 separated from the pulley 102 by a predetermined distance along a direction that the adhesive unit moves; and a container movement belt 103 placed between the tension pulley 104 and the pulley 102. The container movement motor 67 is electrically connected to the CPU 159 and controlled by the CPU 159 (see FIG. 15).

The container movement belt 103 is fastened with the joint member 107. One side of the joint member 107 supports the adhesive unit 66 and is movably supported on the support rod 105 extending along the movement direction of the adhesive unit 66. The other side of the joint member 107 is movably supported on the support rail 106 with a U-shape section extending in parallel to the support rod 105. In this case, the other side of the joint member 107 is provided with a pair of guide rollers 108 rotating while touching top and bottom of the rail surfaces 106*a* and 106*b* of the support rail 106. The guide rollers 108 are constantly urged to the rail surfaces 106*a* and 106*b* by the leaf spring 109.

Accordingly, with this configuration, when the container movement motor 67 is driven by the CPU 159, the container movement belt 103 is driven to rotate via the motor pulley 97, drive belt 98, pulley 99, gears 100 and 101, and the pulley 102. As a result, the joint member 107 fastened to the container movement belt 103 slides along the support rod 105 and support rail 106. In this case, because the joint member 107 moves in a stable manner with both sides supported on the support rod 105 and the support rail 106, the adhesive unit 66 supported by the joint member 107 moves stably on the straight without any wobble. Therefore, it is possible to accurately dispense the adhesive b (described later).

As shown in FIG. 12 and in FIG. 14, the roller drive mechanism comprises a dispense roller rotation motor 68; a motor pulley 110 fastened to an output shaft of the motor 68; a pulley 112 rotatably supported on the first support frame; a drive belt 111 placed between the pulleys 110 and 112; a drive gear 113 rotating as one body with the pulley 112; a follower gear 114 rotatably supported on the second support frame 206 for engaging the drive gear 113; and a pulley 115 supported on the second support frame 206 and rotating as one body with the follower gear 114. The roller drive mechanism also includes a pulley 117 fastened to one side of the shaft unit 210 rotatably supported by the second support frame 206 and the third support frame 208; a drive belt 116 placed between the pulleys 115 and 117; a pulley 118 fastened to the other side of the shaft unit 210; a tension pulley 121 separated from the pulley 118 by a predetermined distance along the transport direction of the adhesive motor 66; a dispense roller rotation pulley 120 fastened to the rotating shaft 68*c* on the dispense roller 68*b*; a dispense roller rotation belt 119 placed between the pulleys 118, 120 and 121; and a tension roller 122 for applying a constant tension to the dispense roller rotation belt 119 by pushing the dispense roller rotation belt 119 on both sides of the dispense roller rotation pulley 120 and near the pulley 118. The tension roller 122 is also provided in the drive belt 116. The roller rotation motor 68 is electrically connected to the CPU 159 and is controlled by the CPU 159 (see FIG. 15).

Accordingly, with this configuration, when the dispense roller rotation motor 68 is driven by the CPU 159, the dispense roller rotation belt 119 is driven through the motor pulley 110, the drive belt 111, the pulley 112, the gears 113 and 114, the pulley 115, the drive belt 116, and the pulleys 117 and 118. As a result, the dispense roller rotation pulley 120 rotates with the dispense roller rotation belt 119, and the dispense roller 68*b* interconnected via the dispense roller rotation pulley 120 and rotating shat 68*c* is also rotated.

As described above, the adhesive dispensing unit 22 is disposed between the cover adhesion unit 60 (described later) disposed at a downstream side of the fifth transport path E and the reference plate 45 (See FIG. 1). Through the movement mechanism, the adhesive unit 66 of the adhesive dispensing unit 22 moves between a dispensing area 155 for dispensing the adhesive b to the sheet bundle S1 (in FIG. 15, the adhesive unit 66 positioned at an arbitrary position (the first position) in the dispensing area 155), an idling position 156 (retracted position or second position indicated by hidden line in FIG. 16) retracted from the transport path of the sheet bundle S1 to prepare for the dispensing process, and a refilling position 157 (second position indicated by solid line in FIG. 16) for refilling the adhesive b.

In this case, the container HP sensor 72 disposed at a predetermined position (other than the dispensing area 155) on the movement path of the adhesive unit 66 detects the idling position 156 (see FIG. 16). That is, while the adhesive unit 66 is moving, the container HP sensor 72 detects (turning on) the container HP sensor flag 162 provided on the joint member 107 sliding along with the adhesive unit 66, so that the CPU 159 stops the container movement motor 67 according to the detection signal, and the adhesive unit 66 is positioned at the idling position 156 (see FIG. 13).

The CPU 159 recognizes the refilling position 157 as a position away from the idling position 156 (where the sensor 72 turns on) by a predetermined distance (for example 14 mm) in a direction away from the sheet bundle S1. The CPU 159 recognizes the dispensing area 155 as a region between a startup position P away from the idling position 157 by a predetermined distance in a direction approaching the sheet bundle S1 and a return position Q of the adhesive unit 66 away from the startup position P by a predetermined distance in a direction away from the idling position 156. In this embodiment, the idling position 156 and refilling position 157 are disposed separately, and it is also acceptable that the refilling position 157 is the same as the idling position 156.

A process of dispensing the adhesive b at the adhesive dispensing unit 22 to the edge of the sheet bundle S1 sent from the stacking unit 42 with the grippers 55*a* and 55*b* will be described next. First, as described above, the grippers 55*a* and 55*b* nip and move the sheet bundle S1 downwardly from the stacking unit 42, and the sheet bundle S1 is positioned at a predetermined position in the dispensing area 155 in the movement path of the adhesive unit 66 (position shown in FIG. 15). In this case, a gap between the edge of the sheet bundle S1 and dispense roller 68*b* is adjusted according to the thickness of the sheet bundle S1. In other words, as described above, the gripper opening amount detection sensor 74*a* detects the opening amount sensor flag 74*b* moving along with the slide gripper 55*b*, so that the thickness of the sheet bundle S1 nipped between the grippers 55*a* and 55*b* is determined. Accordingly, the CPU 159 controls the grippers 55*a* and 55*b* to move vertically based on the detection information to determine the gap between the edge of the sheet bundle S1 and the dispense roller 68*b*.

When the sheet bundle S1 is positioned at a predetermined position in the dispensing area 155, the CPU 159 moves the adhesive unit 66 from the idling position 156 toward the startup position P in the dispensing area 155 (see FIG. 15). Then, the adhesive unit 66 moves from the startup position P toward the return position Q relative to the sheet bundle S1, while the dispense roller 68*b* rotates in the forward direction and contacts the edge of the sheet bundle S1. Accordingly, the dispense roller 68*b* dispenses the adhesive b uniformly to the edge of the sheet bundle S1 while the adhesive b in the container 66*a* is held on the surface the dispense roller 68*b*.

When the adhesive unit 66 reaches the return position Q, the dispense roller 68*b* stops rotating in the forward direction and the adhesive unit 66 stops. From this point, the dispense roller 68*b* rotates in the reverse direction, and the adhesive unit 66 moves from the return position Q toward the startup position P. When the adhesive unit 66 reaches the startup position P, the dispense roller 68*b* stops rotating in the reverse direction. After the adhesive unit 66 moves back and forth, for example, twice, the adhesive b is completely dispensed.

When the adhesive b is completely dispensed to the edge of the sheet bundle S1, the adhesive unit 66 moves to the idling position 157 or the refilling position 156 to ensure the transport path for the sheet bundle S1. The CPU 159 controls the movement of the adhesive unit 66 via the container movement motor 67 based on the detection result of the container HP sensor 72 as described above. Then, the sheet bundle S1 nipped by the grippers 55*a* and 55*b* is lowered to the cover adhesion unit 60 through the transport path ensured when the adhesive unit 66 is retracted (direction perpendicular to the movement direction of the adhesive unit 66, see FIG. 16).

Figure 8:
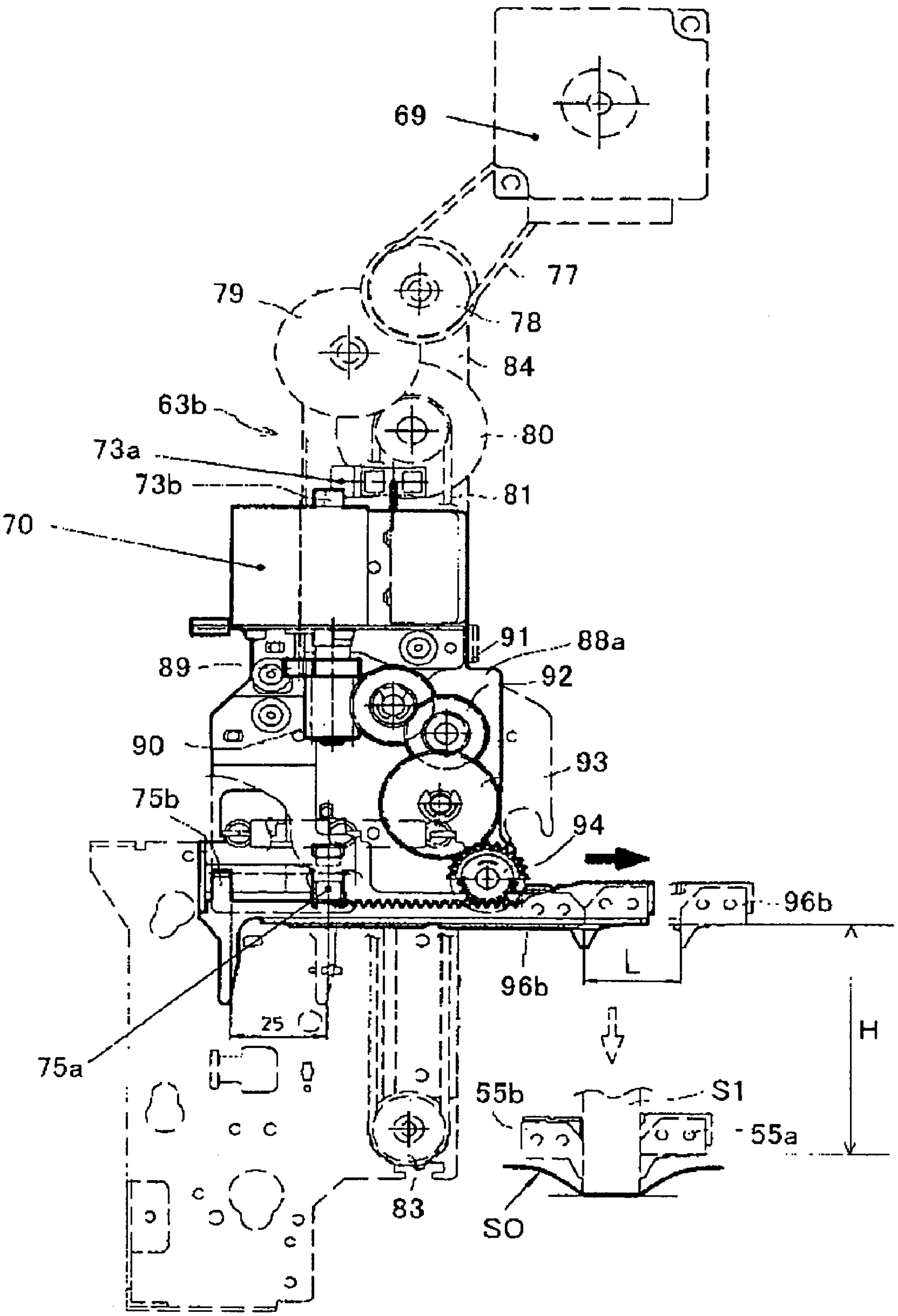
FIG. 8 is a side view of the other side of the opening and closing mechanism of the grippers.

A cover sheet S0 is transported to the cover adhesion unit 60 and stays there while the adhesive b is dispensed to the edge of the sheet bundle S1 (see FIG. 8). In this case, the cover supply means transports the cover sheet S0 from the apparatus main unit 2 to the cover adhesion unit 60 as shown in FIG. 2. In other words, the cover sheet S0 is transported into the fifth transport path E via the first and second switching flappers 27 and 32, and then is positioned at a predetermined position on the cover adhesion unit 60 crossing the transport path of the sheet bundle S1 with a cover transport drive roller 57 in the transport path E. The grippers 55*a* and 55*b* push the edge of the sheet bundle S1 with the adhesive b dispensed thereto against the cover sheet S0 at the predetermined position (see FIG. 8). In this state, the grippers 55*a* and 55*b* move the sheet bundle S1 further downwardly with the cover sheet S0 attached to the edge thereof by the adhesive b, and press the sheet bundle S1 against the slidable pushing plate 59 positioned below the cover adhesion unit 60 (see FIG. 2). Then, in a state that the cover sheet S0 and the sheet bundle S1 are pressed against the pushing plate 59, the cover sheet S0 and the sheet bundle S1 are pressed from both sides by slidable back-folding plates 58 (see FIG. 2). Accordingly, the cover sheet S0 is folded according to the thickness of the sheet bundle S1.

After the pushing plate 59 slides outwardly to form the transport path for the sheet bundle S1, the grippers 55*a* and 55*b* transport the sheet bundle S1 with the cover sheet S0 downwardly to the cutting unit 23 (see FIG. 1). At this time, if the grippers 55*a* and 55*b* do not have a stroke enough to hand-over the sheet bundle S1 to the cutting unit 23, the grippers 55*a* and 55*b* transport the sheet bundle S1 with the cover sheet S0 downwardly by a predetermined distance. The grippers 55*a* and 55*b* release the sheet bundle S1 once the back-folding plate 58 nips the sheet bundle S1. Then, the grippers 55*a* and 55*b* move upwardly and nip the sheet bundle S1 again at an upper position, so that the grippers 55*a* and 55*b* transport the sheet bundle downwardly. Accordingly, even if the grippers 55*a* and 55*b* do not have a sufficient stroke, it is possible to transport the sheet bundle S1 to the cutting unit 23.

In a case that the adhesive b is dispensed repeatedly, an amount of the adhesive b in the container 66*a* decreases, and it is necessary to refill the adhesive b in the container 66*a*. In the embodiment of the present invention, it is possible to detect the amount of the adhesive b in the container 66*a*, so that the adhesive unit 66 moves to the refilling position 157 automatically or as needed.

That is, a reference level 161 is set at a height of a liquid level of the adhesive b filled in the container 66*a*. An adhesive amount detection sensor 160 is disposed in the adhesive dispensing unit 22 as detection means for detecting a height of the liquid level (uppermost level) of the adhesive b in the container 66*a* (see FIG. 15). The CPU 159 calculates the amount of the adhesive b in the container 66*a* from the current height detected by the adhesive amount detection sensor 160 and the reference level 161, and determines if the adhesive b needs to be refilled based on the calculation. At a predetermined timing or as requested by an operator, the adhesive unit 66 moves from the dispensing area 155 or the idling position 156 to the refilling region 157.

An adhesive refilling mechanism (refilling means) K for refilling the adhesive in the container 66*a* in the adhesive unit 66 at the refilling position 156 will be explained in reference to the FIG. 17 to FIG. 21. As shown in FIG. 16, the adhesive refilling mechanism K is disposed above the refilling position 157. As shown in FIG. 17 and in FIG. 18, the adhesive refilling mechanism K comprises an adhesive stick storage unit 153 for storing a plurality of adhesive bodies in a solid stick shape (hereinafter called an adhesive stick 163); a rotating mechanism (moving means) 230 for rotating the adhesive stick storage unit 153 as rotating drive means; a pushing mechanism 240 for pushing the adhesive stick 163 in the adhesive stick storage unit 153 downwardly at the discharge position (discharge unit) 158; and a feeding mechanism 250 for discharging the adhesive stick 163 pushed by the pushing mechanism 240 from the adhesive stick storage unit 153 through the outlet 164 and for feeding the adhesive stick 163 into the container 66*a* in the adhesive unit 66 (see FIG. 16 and FIG. 21). An operator supplies the adhesive stick 163 to the adhesive stick storage unit 153 through the transport inlet G.

The adhesive refilling motor 123 rotates in forward and reverse directions to drive the rotating mechanism 230, the pushing mechanism 240, and the feeding mechanism 250 (adhesive moving means). In this case, as described below, when the adhesive refilling motor 123 rotates in the forward direction, the drive force is transmitted to the rotating mechanism 230 to rotate the adhesive stick storage unit 153. When the adhesive refilling motor 123 rotates in the reverse direction, the drive force is transmitted to the pushing mechanism 240 and the feeding mechanism 250 to drive the adhesive stick pushing arm 140 and adhesive stick feed drive roller 149.

Figure 17:
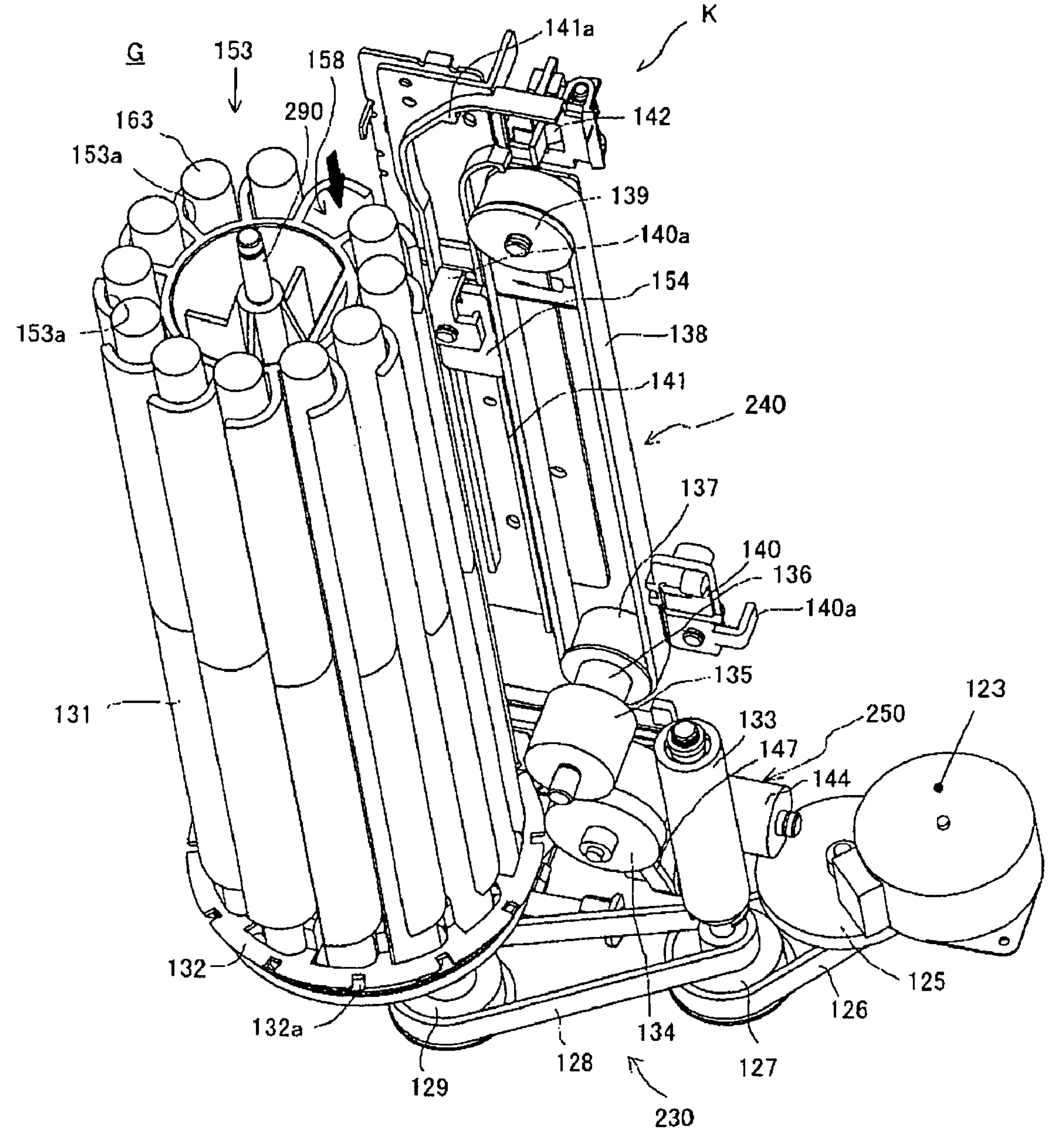
FIG. 17 is a perspective view of an adhesive refilling mechanism.

As shown in FIG. 17, the adhesive stick storage unit 153 is formed in a substantially cylindrical rotating body rotatably supported on the rotating support member 290. A plurality of adhesive stick storage units 153*a* separated by the separating members 131 is provided on a periphery of the adhesive stick storage unit 153. In other words, the separating members 131 divide the adhesive stick storage unit 153 into a plurality of cylindrically shape portions to form the adhesive stick storage units 153*a* (having a substantially cylindrical shape). The separating members 131 separate the adhesive stick storage unit 153 to form a plurality of adhesive stick storage units 153*a* for storing the adhesive sticks 163, so that the adhesive sticks 163 stored in the adhesive stick storage unit 153 do not contact with each other.

The rotating mechanism 230 rotates the adhesive stick storage unit 153, so that one of the adhesive stick storage units 153*a* is positioned at the discharge position 158. In other words, the adhesive stick storage unit 153 rotates (moves) between a transfer portion G as a first position where the adhesive sticks 163 are received for refill and stored individually and a discharge position 158 as a second position where the adhesive sticks 163 are refilled into the container 66*a* in the adhesive unit 66.

Figure 19:
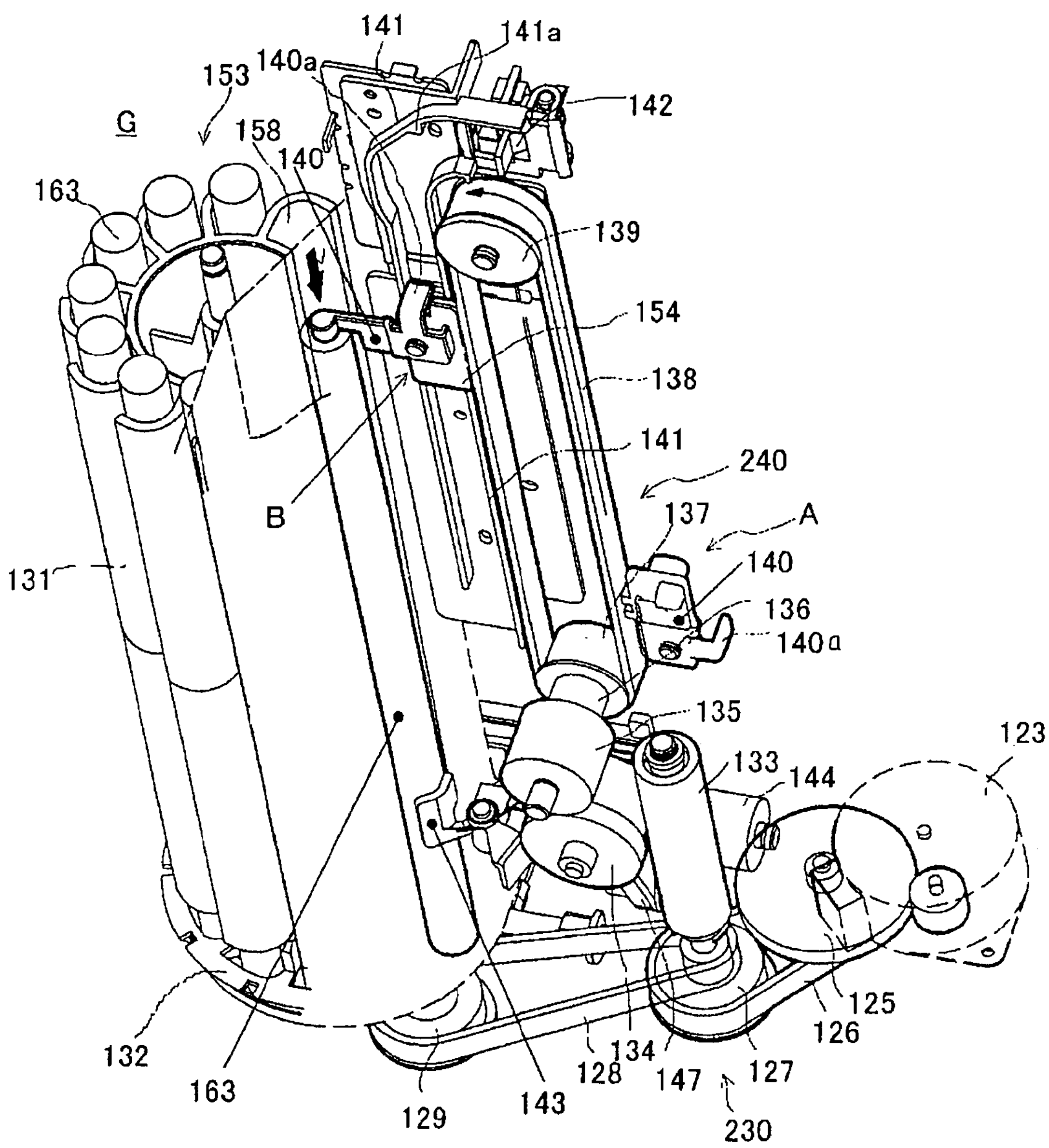
FIG. 19 is a perspective view mainly showing a push mechanism for pushing an adhesive stick into the adhesive unit.
Figure 32:
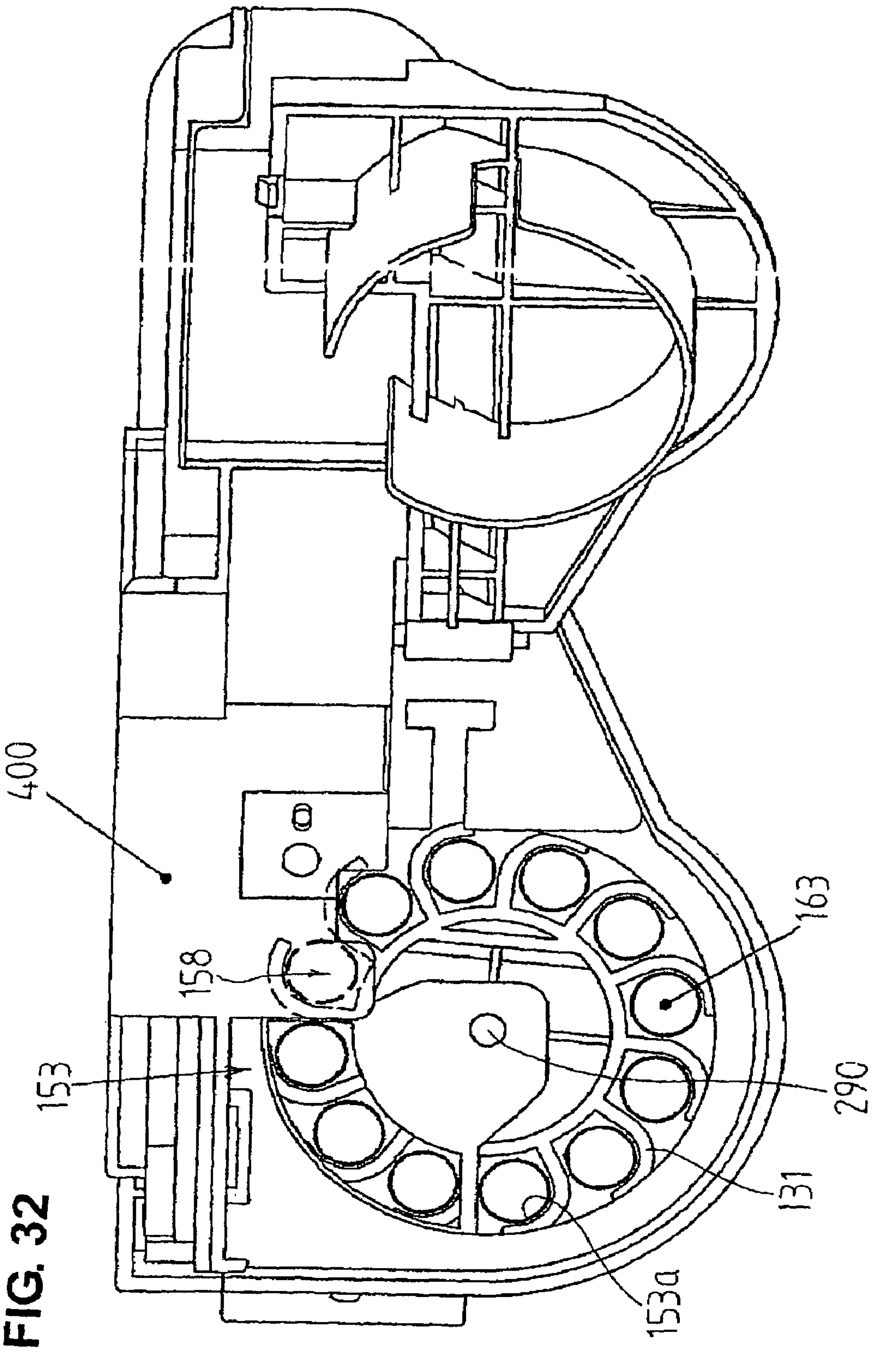
FIG. 32 is a plan view of the adhesive refilling mechanism equipped with a cover member.

An adhesive stick empty sensor 143 is disposed at the discharge position 158 for detecting the adhesive stick 163 in the adhesive stick storage unit 153*a* positioned at the discharge position 158 (see FIG. 19). The adhesive stick storage unit 153 has a circular clock plate (encoder) 132 rotating as a single body with the adhesive stick storage unit 153 at a bottom thereof. The clock plate 312 is provided with a plurality of slits 132*a* for detection on a periphery thereof at a predetermined interval. In this embodiment of the present invention, it is preferred to provide a cover plate 400 at the transfer inlet G, so that the adhesive sticks 163 are not transported to the adhesive stick storage units 153*a* at the discharge position 158, as shown in FIG. 32.

Figure 18:
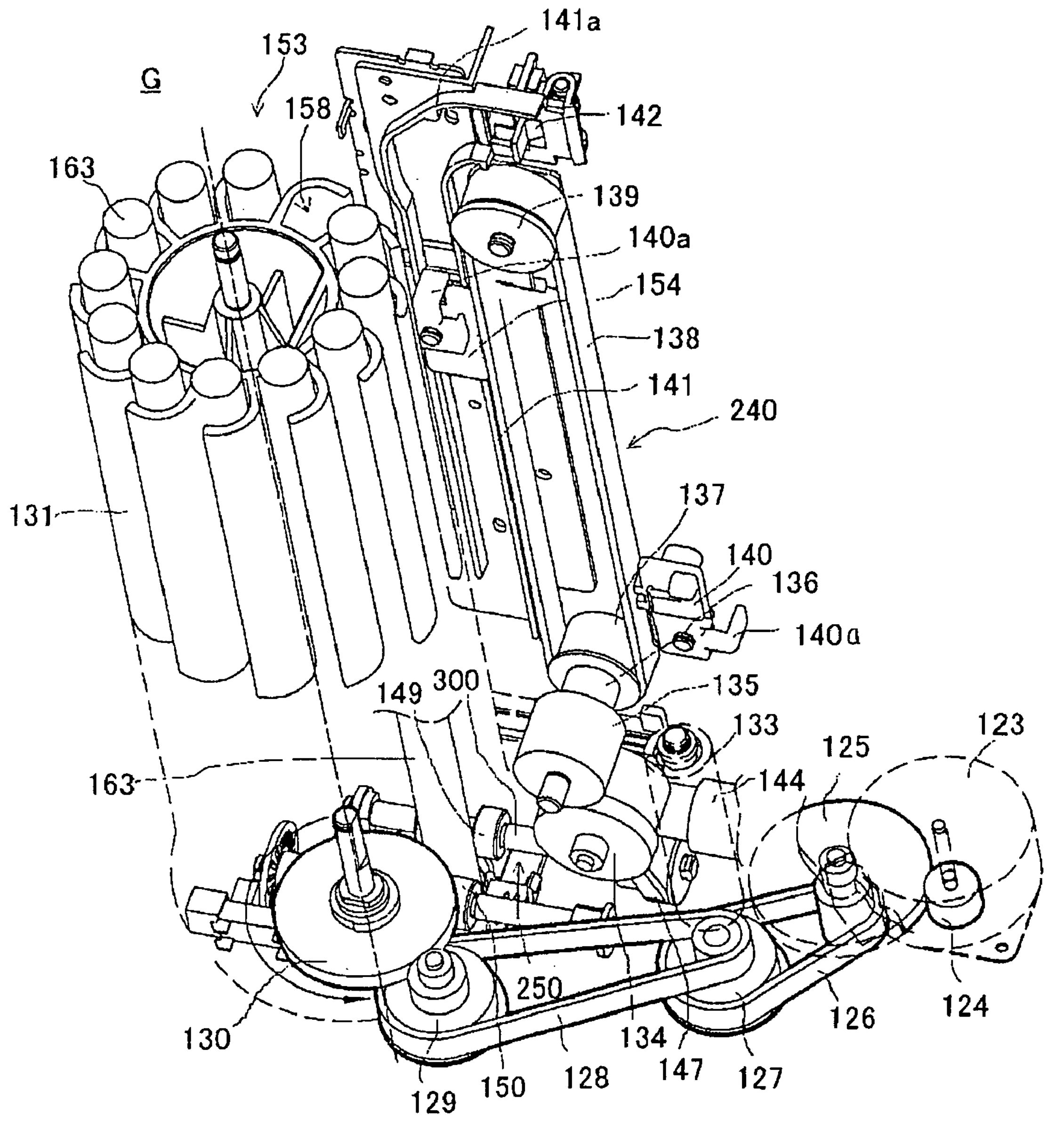
FIG. 18 is a perspective view mainly showing a drive mechanism for rotating an adhesive stick storage unit.

As shown in FIG. 18, the rotating mechanism 230 rotates the adhesive stick storage unit 153, and comprises a motor gear 124 mounted on an output shaft of an adhesive refilling motor 123; a first gear pulley 125 for engaging the motor gear 124; a first pulley 127 away from the first gear pulley 125 by a predetermined distance; a first drive belt 126 placed between the pulley 125 and the pulley 127; a gear pulley 129 away from the first pulley 127 by a predetermined distance; a second drive belt placed between the pulley 127 and the pulley 129; and a one-way gear 130 rotating as a one body with the adhesive stick storage unit 153 and engaging the second gear pulley 129. In this case, when the adhesive refilling motor 123 rotates in the reverse direction, the one-way gear 130 does not transmit drive force to the adhesive stick storage unit 153, so that the adhesive stick storage unit 153 does not rotate.

Accordingly, with this mechanism, when the adhesive refilling motor 123 rotates in the forward direction, the one-way gear 130 rotates in the arrow direction in FIG. 18 via the motor gear 124, first gear pulley 125, the first drive belt 126, the first pulley 127, the second drive belt 128 and second gear pulley 129 to rotate the adhesive stick storage unit 153.

As shown in FIG. 19, the pushing mechanism 240 and the rotation mechanism 230 share the motor gear 124, the first gear pulley 125, the first drive belt 126 and the first pulley 127. The pushing mechanism 240 comprises, as independent elements, a worm gear (one-way gear) 133 rotating as one body with the first pulley 127; a first gear 134 engaging the worm gear 133; a second gear 135 engaging the first gear 134; a second pulley 137 interconnected to the second gear 135 via a torque clutch 136; a tension pulley 139 away from the second pulley 137 upwardly by a predetermined distance; a belt 138 placed between the pulley 137 and the pulley 139; an adhesive stick pushing arm 140 fixed to the belt 138 via a joint member 154; and a guide rail 141 for an arm extending between the belt 138 and the adhesive stick storage unit 153.

In this case, when the adhesive refilling motor 123 rotates in the forward direction, the one-way gear 133 does not transmit the drive force to the first gear 134, so that the adhesive stick pushing arm 140 does not rotate. The torque clutch 136 idles when the adhesive stick pushing arm 140 pushes the adhesive stick 163 excessively against the dispense roller 68*b* in the adhesive unit 66 to prevent damage on the adhesive stick 163 (described below). A spring (not shown) urges the adhesive stick pushing arm 140 to be held in parallel to the belt 138 (see A in FIG. 19) in a usual state. When an abutting portion 140*a* protruding from the adhesive stick pushing arm 140 engages an abutting portion 141*a* (described below) on the guide rail 141, the adhesive stick pushing arm 140 is moved to be held perpendicular to the belt 138 (see B in FIG. 19) against the urging force of the spring. Accordingly, the adhesive stick pushing arm 140 contacts a top edge of the adhesive stick 163 in an adhesive stick storage unit 153*a* positioned at the discharge position 158.

The guide rail 141 extends along the belt 138 from a turn over position of the adhesive stick pushing arm 140 at a side of the tension pulley 139 to a turn over position at a side of the second pulley 137 along a belt travel path. The guide rail 141 includes the abutting portion 141*a* at the turn over position at a side of the tension pulley 139 for converting the adhesive stick pushing arm 140 from the parallel state A to the perpendicular state B against the urging force of the spring through the engagement with the abutting portion 140*a* on the adhesive stick pushing arm 140. A surface of the guide rail 141 pushes the adhesive stick pushing arm 140 to be held in the perpendicular state thereof at a downstream side further than the abutting portion 141. An arm HP sensor 142 is provided on the guide rail 141 at the turn over position of the tension pulley, i.e. at an upstream side of the abutting portion 141, for detecting a home position of the adhesive stick pushing arm 140.

Figure 21:
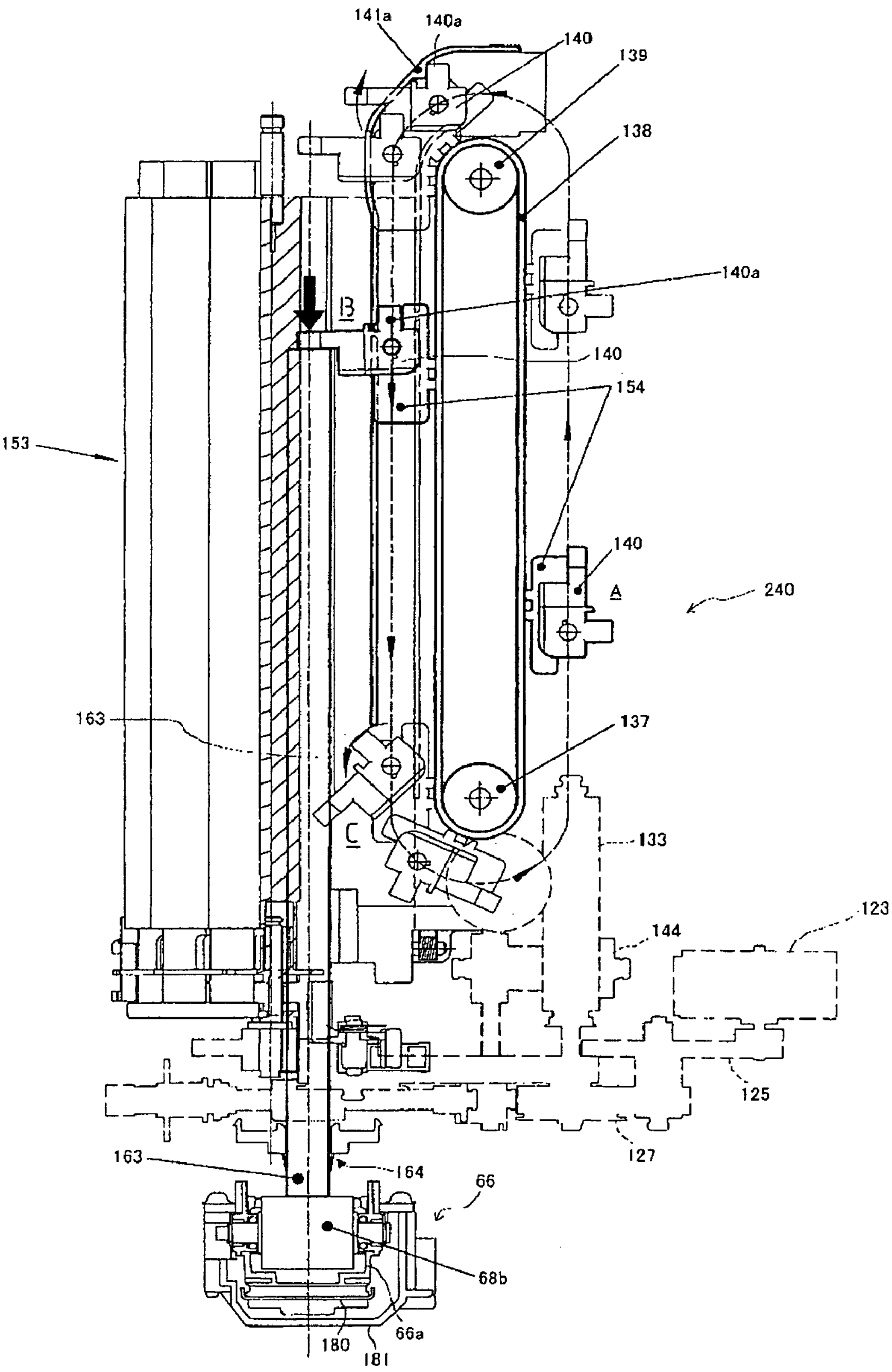
FIG. 21 is a side view of the feed mechanism shown in FIG. 20.

With this configuration, when the adhesive refilling motor 123 rotates in the reverse direction, the belt 138 rotates via the motor gear 124, the first gear pulley 125, the first drive belt 126, the first pulley 127, the worm gear 133, the first gear 134, the second gear 135, the torque clutch 136 and the second pulley 137 to move the adhesive stick pushing arm 140 along with the belt 138. During this movement, as shown in FIG. 21, when the abutting portion 140*a* on the adhesive stick pushing arm 140 engages the abutting portion 141*a* on the guide rail, the adhesive stick pushing arm 140 is converted from the state A in parallel to the belt 138 to the state B perpendicular to the belt 138 (the guide rail 141) against the urging force of the spring. The adhesive stick pushing arm 140 held in the perpendicular state B is guided along the rail surface of the guide rail 141, and contacts the top of the adhesive stick 163 in the adhesive stick storage unit 153*a* positioned at the discharge position 158 to push the adhesive stick 163 downwardly. The adhesive stick pushing arm 140 returns to the parallel state A through the urging force of the spring when released from the guide rail just before the turn over position at the second pulley 137 (see C in FIG. 21). At this point, the adhesive stick pushing arm 140 is held in the parallel state A until the adhesive stick pushing arm 140 engages the abutting portion 141*a* on the guide rail 141 again.

Figure 20:
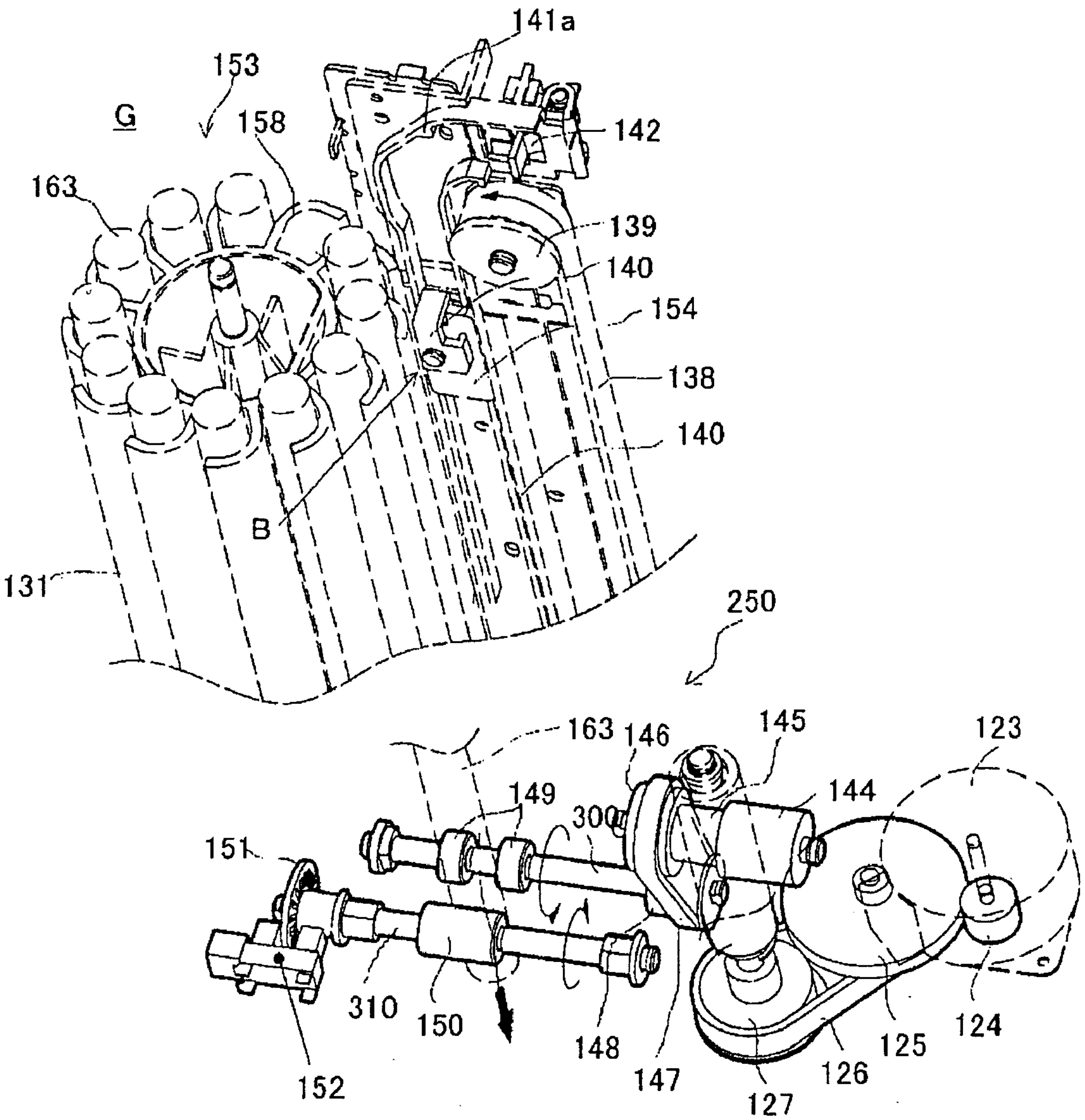
FIG. 20 is a perspective view mainly showing a feed mechanism for feeding an adhesive stick into the adhesive unit.

As shown in FIG. 20, the feeding mechanism 250 shares the motor gear 124, the first gear pulley 125, the first drive belt 126, and the first pulley 127 with the rotation mechanism 230 and the pushing mechanism 240. The feeding mechanism 250 shares the worm gear 133 with the pushing mechanism 240. The feeding mechanism 250 includes, as independent elements, a third gear 144 engaging the worm gear 133; a third pulley 146 interconnected to the third gear 144 via a torque clutch 145; a first rotating shaft 300 away from the third pulley 146 by a predetermined distance; a fourth pulley 148 fixed to one side of the first rotating shaft 300; a third drive belt 147 placed between the pulley 146 and the pulley 148; a feed drive roller 149 fixed to the first rotating shaft 300 for pushing the adhesive stick 163 downwardly; a second rotating shaft 310 extending in parallel to the first rotating shaft 300; and the follower roller 150 fixed to the second rotating shaft 310 for pushing the adhesive stick 163 downwardly in cooperation with the feed drive roller 149. The torque clutch 145 idles when the feed drive roller 149 pushes the adhesive stick 163 excessively against the dispense roller 68*b* in the adhesive unit 66, as described below, to prevent damage on the adhesive stick 163.

The feed mechanism 250 is provided with detection means for detecting a feed amount of the adhesive stick 163, i.e. an amount that the arm pushes the adhesive stick 163. The detection means is composed of a clock plate (encoder) 151 fixed to the second rotating shaft 310 and a feed amount detection sensor for detecting the feed amount of the adhesive stick 163 from an amount of rotation of the clock plate 151 accompanied with rotation of the feed rollers 149 and 150. The feed amount detection sensor 152 send a detection signal to the CPU 159.

Accordingly, with this configuration, when the adhesive refilling motor 123 rotates in the reverse direction, the first rotating shaft 300 rotates via the motor gear 124, first gear pulley 125, the first drive belt 126, the first pulley 127, the worm gear 133, the third gear 144, the torque clutch 145, the third pulley 146, the third drive belt 147, and the fourth pulley 148 to rotate the feed drive roller 149 fixed to the first rotating shaft 300. As a result, the adhesive stick 163 contacting between the feed drive roller 149 and the feed follower roller 150 is fed downwardly toward the container 66*a* in the adhesive unit 66 through the outlet 164.

An operation of refilling the adhesive in the container 66*a* in the adhesive unit 66 with the adhesive refilling mechanism K will be explained next. As described above, according to a predetermined timing (or automatically) or a request of an operator, the adhesive unit 66 moves from the dispensing area 155 or the idling position 156 to the refilling position 157. The adhesive is refilled into the container 66*a* in the adhesive unit 66 from the adhesive refilling mechanism K for an amount calculated by the CPU 159 based on the detection signal from the adhesive amount detection sensor 160 (see FIG. 15).

More specifically, when the adhesive stick 163 is detected at the discharge position 158 by the adhesive stick empty sensor 143 (see FIG. 19), the adhesive stick pushing arm 140 and the paired feed rollers 149 and 150 are driven by the operations of the pushing mechanism 240 and feed mechanism 250 as described above. The adhesive stick 163 in the adhesive stick storage unit 153*a* positioned at the discharge position 158 is fed downwardly to the container 66*a* in the adhesive unit 66 through the outlet 164. At this time, the adhesive refilling motor 123 rotates in the reverse direction, so that the rotating mechanism 230 is not driven and the adhesive stick 163 is smoothly fed downwardly while being held at the discharge position 158.

When the adhesive stick empty sensor 143 does not detect the adhesive stick 163 at the discharge position 158, the adhesive stick storage unit 153 rotates through the operation of the rotating mechanism 230 described above until the adhesive stick 163 in the adhesive stick storage unit 153*a* is positioned at the discharge position 158. At this time, the adhesive refilling motor 123 rotates in the forward direction, so that the pushing mechanism 240 and the feeding mechanism 250 are not driven and the adhesive stick pushing arm 140 does not advance into the rotating adhesive stick storage unit 153. When the adhesive stick empty sensor 143 detects the adhesive stick 163 in the adhesive stick storage unit 153*a* positioned at the discharge outlet 158, the pushing mechanism 240 and feeding mechanism 250 are driven, so that the adhesive stick pushing arm 140 and the paired adhesive stick feed rollers 149 and 150 perform the operation of refilling the adhesive stick 163.

In the process of refilling the adhesive stick 163 using the pushing mechanism 240 and feeding mechanism 250, the adhesive stick pushing arm 140 and the paired adhesive stick feed rollers 149 and 150 push the adhesive stick 163 toward the dispense roller 68*b* in the adhesive unit 66 to melt. The adhesive stick pushing arm 140 pushes the adhesive stick 163 downwardly to melt the same until the adhesive stick pushing arm 140 is released from the guide rail 141. Accordingly, the adhesive stick pushing arm 140 is converted from the state B perpendicular to the belt 130 to the state A in parallel to the belt 138 with the urging force of the spring, as described above, and is held in the parallel state A while moving along with the belt 138. The adhesive stick pushing arm 140 is held in the parallel state A except in the operation of pushing the adhesive stick 163, thereby reducing a space for the pushing mechanism.

After the adhesive stick pushing arm 140 is converted and held in the parallel state A, only the paired feed rollers 149 and 150 push the adhesive stick 163 further downwardly. During this time, the adhesive stick pushing arm 140 receives the drive force from the adhesive refilling motor 123, i.e. the common drive source shared with the paired feed rollers 149 and 150, so that the adhesive stick pushing arm 140 continues to move along with the belt 138.

After only the paired feed rollers 149 and 150 push the adhesive stick 163 downwardly to complete the refilling using the adhesive stick 163 at the discharge position 158, the adhesive stick storage unit 153 rotates to move the next adhesive stick 163 to the discharge position 158. Note that at this time, if the adhesive stick pushing arm 140 is inserted into the adhesive stick storage unit 153*a* at the discharge position 158 while moving, the rotation of the adhesive stick storage unit 153 is hindered and may damage the adhesive stick pushing arm 140 or the adhesive stick storage unit 153. For that reason, in this embodiment of the present invention, when the adhesive stick pushing arm 140 is detected by the arm HP sensor 142, the adhesive refilling motor 123 stops rotating in the reverse direction (stopping the drive of the pushing mechanism 240 and feeding mechanism 250). Then, the adhesive refilling motor 123 rotates in the forward direction to rotate the adhesive stick storage unit 153. Note that the CPU 159 controls the operation as described above.

In this way, the adhesive (adhesive stick 163) is refilled into the container 66*a* in the adhesive unit 66 from the adhesive refilling mechanism K by only the amount calculated by the CPU 159 based upon the detection signal from the adhesive amount detection sensor 160 (see FIG. 15), and the refilling operation is completed. In this case, the CPU 159 recognizes the refilled amount of the adhesive stick 163 through the feed amount detection sensor 152 detecting the amount of rotation of the clock plate 151 rotating along with the paired feed rollers 149 and 150.

As described above, according to the embodiment of the present invention, the adhesive dispensing apparatus and image forming apparatus comprise the grippers 55*a* and 55*b* as support means for supporting the sheet bundle S1, and the adhesive unit 66 as the dispensing means for dispensing the adhesive to the edge of the sheet bundle S1 supported by the grippers 55*a* and 55*b*. The sheet bundle S1 is transported with the edge having the adhesive dispensed by the adhesive unit 66 as the leading edge.

The sheet bundle S1 is transported with the edge having the adhesive dispensed by the adhesive unit 66 as the leading edge. Accordingly, it is not necessary to provide a large amount of space for the transport path. Also, the edge of the sheet bundle S1 does not contact the transport path during the transportation, so that the adhesive is not scraped off even if there is no special apparatus for strictly controlling the dispensing amount of the adhesive. Therefore, it is possible to securely attach each of the sheets composing the sheet bundle S1 together and to sufficiently attach the cover sheet to the sheet bundle S1 without increasing the size of the apparatus or cost. Also, the adhesive does not stick to the wall of the transport path, thereby transporting the subsequent sheet bundle S1 smoothly.

In the embodiment of the present invention, the adhesive dispensing apparatus and image forming apparatus transport the sheet bundle S1 with the edge having the adhesive dispensed by the adhesive unit 66 as the leading edge and push the edge of the sheet bundle S1 against the cover sheet S0 set at a predetermined position. With this configuration, it is possible to correct the skew generated between the sheets S in the transport direction during transporting the sheet bundle S1 (during the transportation) using the rotating body such as the rollers pushing the edge of the sheet bundle S1 toward the cover sheet S0.

In the embodiment of the present invention, the adhesive dispensing apparatus and image forming apparatus move the adhesive unit 66 to the dispensing area 155 (first position) where the adhesive is dispensed to the edge of the sheet bundle S1, and to the retracted position 156 and refilling position 157 (second position) where the adhesive unit 66 does not hinder the grippers 55*a* and 55*b* to transport the sheet bundle S1. With this configuration, the sheet bundle S1 does not move to avoid the adhesive unit 66, rather the adhesive unit 66 moves to ensure the transport path for the sheet bundle S1 with the adhesive dispensed therewith, so that the sheet bundle S1 is not shifted easily.

In the embodiment of the present invention, the adhesive dispensing apparatus and image forming apparatus are provided with the grippers 55*a* and 55*b* for nipping and transporting the sheet bundle S1 to the cover sheet S0 set at a predetermined position. Accordingly, even if the sheets S1 are skewed in the transport direction when the transport means transports the sheet bundle S1, it is possible to attach the sheet bundle S1 to the cover sheet while the sheet bundle S1 is pressed against the cover sheet S0 to correct the skew of the sheet S in the transport direction.

In the embodiment of the present invention, the adhesive dispensing apparatus and image forming apparatus dispense the adhesive to the bottom edge of the sheet bundle S1 and transport the sheet bundle S1 downwardly, so that the bottom edge of the sheet bundle S1 is pressed against the cover sheet S0. Accordingly, if the adhesive drips, the cover sheet S0 receives the adhesive and the adhesive does not stick to other portions of the apparatus.

Figure 22:
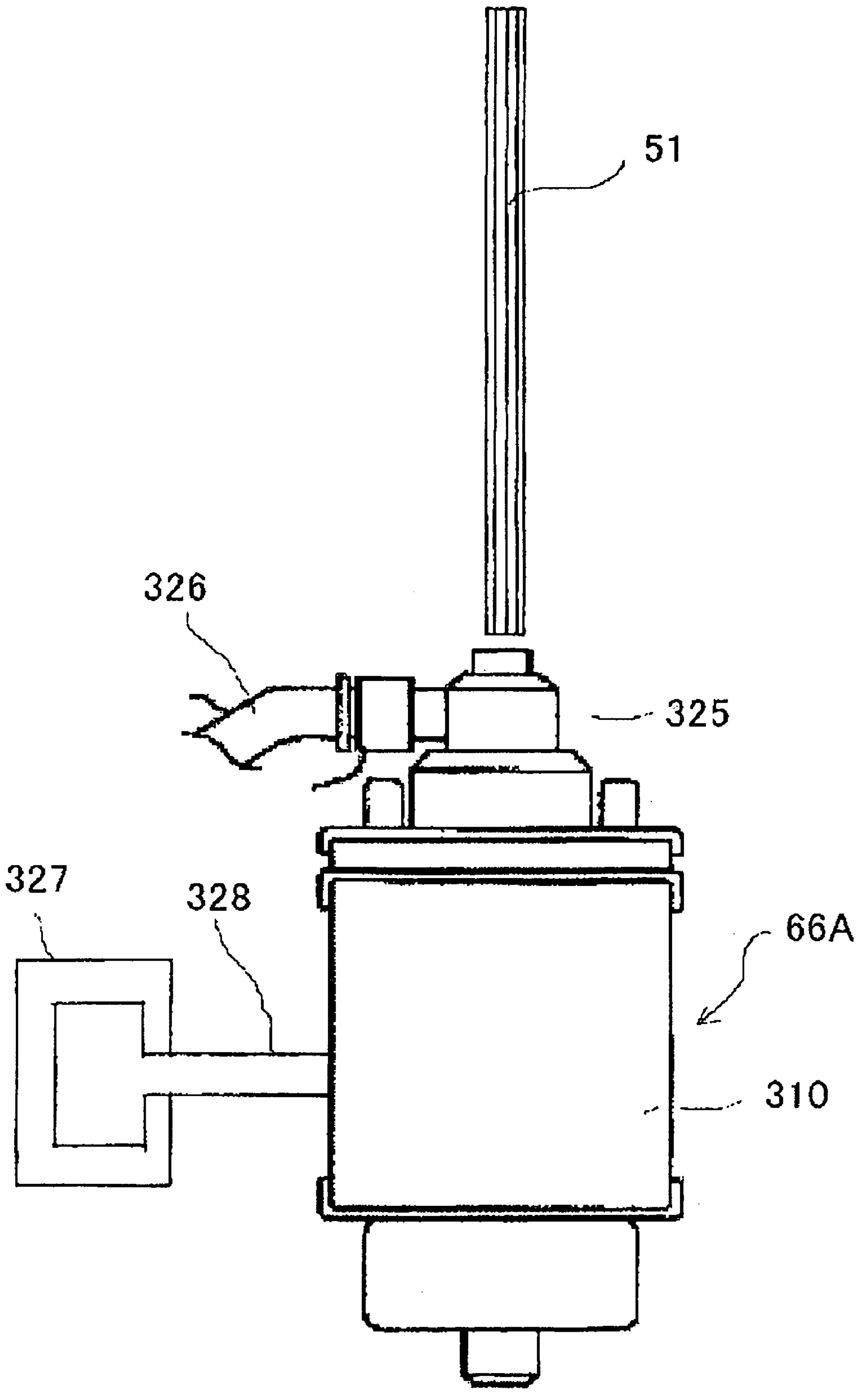
FIG. 22 is a side view of a modified version of the adhesive unit.
Figure 23:
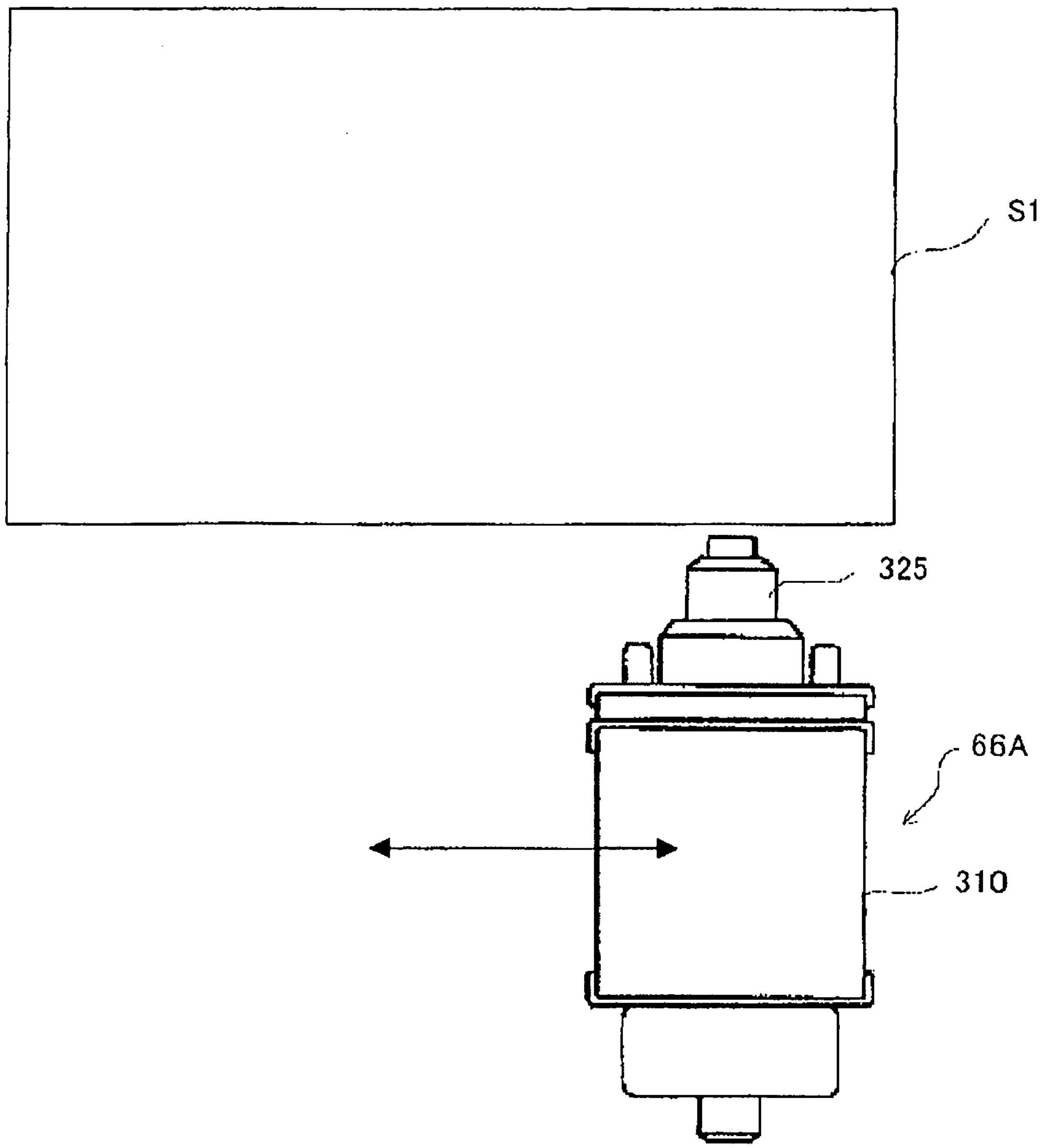
FIG. 23 is a front view of the modified version of the adhesive unit.

FIG. 22 and FIG. 23 show a modified embodiment of the adhesive unit. As shown in FIG. 22 and FIG. 23, according to the modified embodiment, an adhesive unit 66A comprises a container 310 for storing the adhesive, a nozzle 325 as an adhesive discharge member for discharging the adhesive in the container 310 to the edge of the sheet bundle S1, and a refilling tube 326 mounted to the nozzle 325 for refilling the adhesive. A support member 328 is slidably mounted on the guide rail 327 for supporting the adhesive unit 66A, so that a discharge outlet of the nozzle 325 moves along the bottom edge of the sheet bundle S1. As shown in FIG. 23, the nozzle 325 moves from one end of the sheet bundle S1 to the other end thereof while discharging and dispensing the adhesive to the edge of the sheet bundle S1.

With the configuration for discharging the adhesive, it is possible to dispense the adhesive uniformly to the edge of the sheet bundle S1 due to a discharge pressure of the nozzle 325 even if the sheets S of the sheet bundle S1 are shifted.

Figures 24A, 24B:
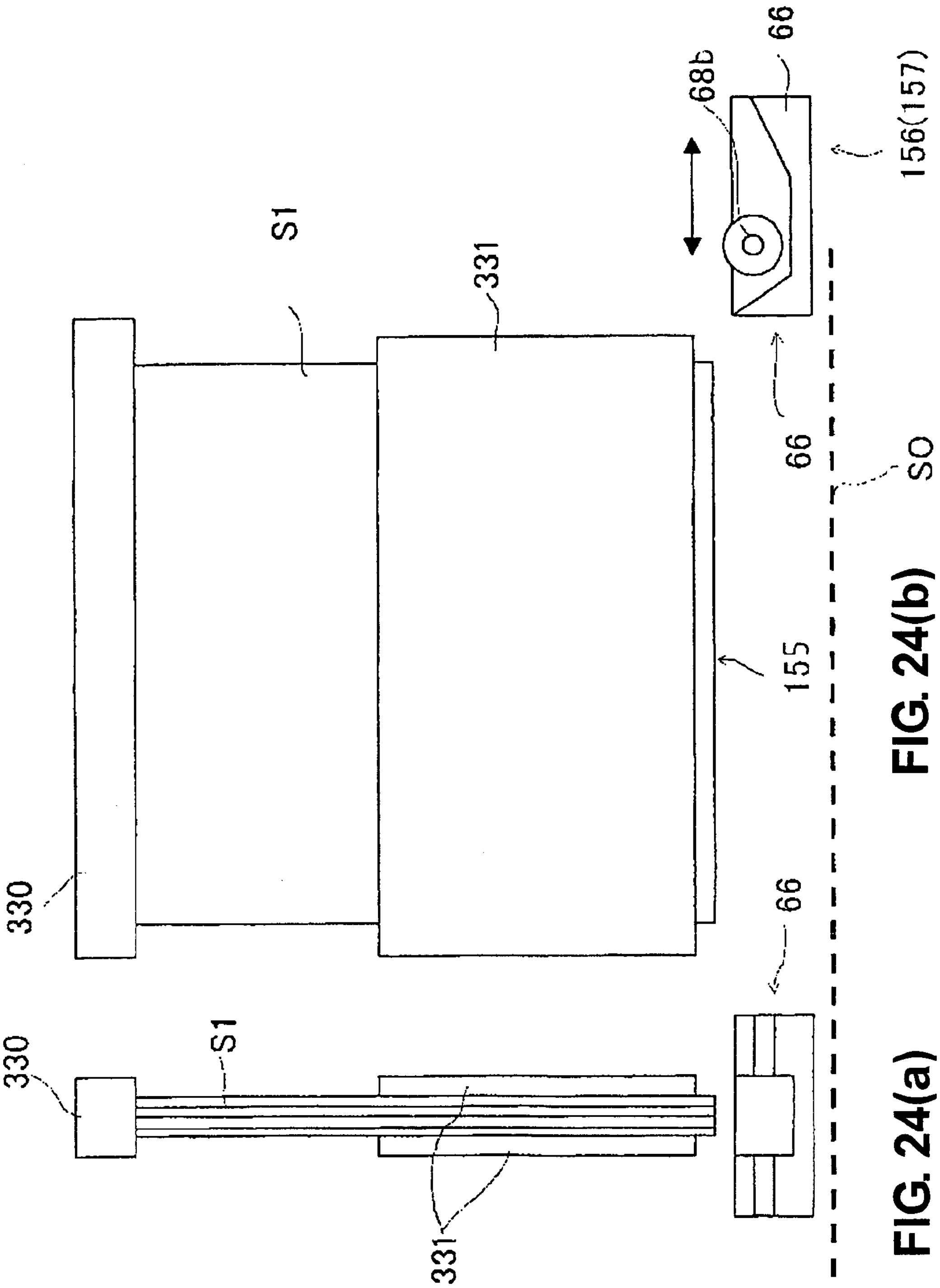
FIGS. 24(*a*) and 24(*b*) are views showing a first embodiment of transport means for transporting the sheet bundle (before a cover sheet is attached), wherein FIG. 24(*a*) is a side view thereof and FIG. 24(*b*) is a front view thereof.
Figures 25A, 25B:
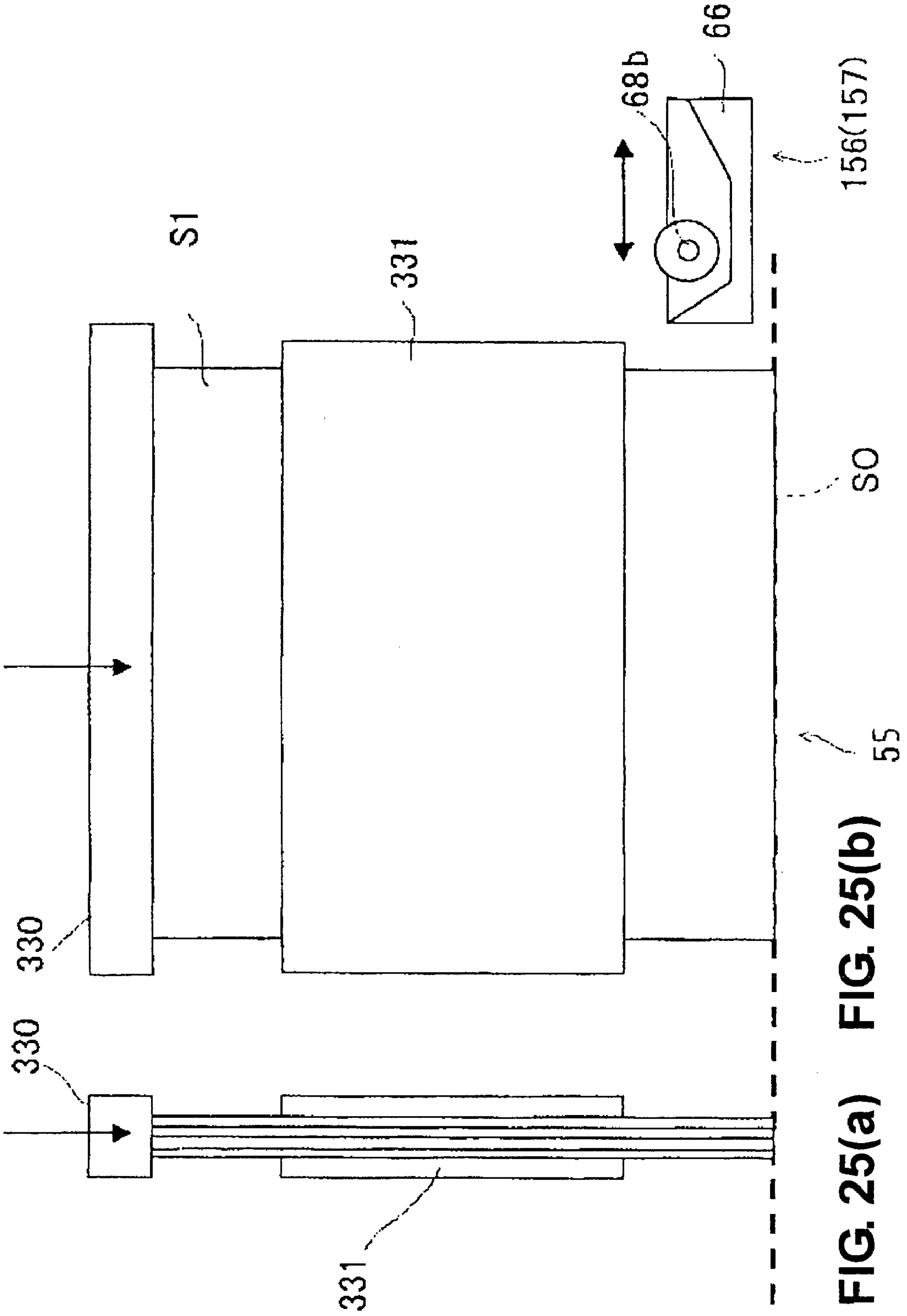
FIGS. 25(*a*) and 25(*b*) are views showing the first embodiment of the transport means for transporting the sheet bundle (after the cover sheet is attached), wherein FIG. 25(*a*) is a side view thereof and FIG. 25(*b*) is a front view thereof.

FIGS. 24(*a*), 24(*b*) and FIGS. 25(*a*) and 25(*b*) show a first embodiment of the sheet bundle transport mechanism for transporting the sheet bundle S1. The sheet bundle transport mechanism (transport means) comprises guides 331 for nipping the sheet bundle S from both sides, and a pusher 330 as an abutting member for pushing a top edge of the sheet bundle S1 (trailing edge in the transport direction) downwardly in a state that the pusher 330 contacts the top edge of the sheet bundle S1. In this configuration, while the guides 331 nip the sheet bundle S, the pusher 330 pushes the sheet bundle S1 downwardly to a position for dispensing the adhesive.

The adhesive unit 66 moves to the dispensing area 155 and dispenses the adhesive to the edge of the sheet bundle S1. When the adhesive is dispensed to the edge of the sheet bundle S, the adhesive unit 66 moves to the idling position 156 or the refilling position 157 to form the transport path for the sheet bundle S1.

FIGS. 25(*a*) and 25(*b*) shows a state that the pusher 330 pushes the edge of the sheet bundle S against the cover sheet S0. In this way, the adhesive is dispensed to the edge of the sheet bundle S1, and the adhesive unit 66A is moved to the idling position 156 or the refilling position 157 to form the transport path for the sheet bundle S1. Then, the pusher 330 pushes the top of the sheet bundle S1 nipped by the guides 331, so that the edge of the sheet bundle S1 having the adhesive dispensed thereto is pressed against the cover sheet S0.

With this configuration, even if the sheets S are shifted in the transport direction when the sheet bundle S1 is transported, the pusher 330 securely pushes the edge of the sheet bundle S1 against the cover sheet S0 in the state that the pusher 330 contacts the trailing edge of the sheet bundle S1 in the transport direction. Therefore, the sheet bundle S1 is securely attached to the cover sheet S0 while the skew of the sheet S in the transport direction is corrected.

Figures 26A, 26B:
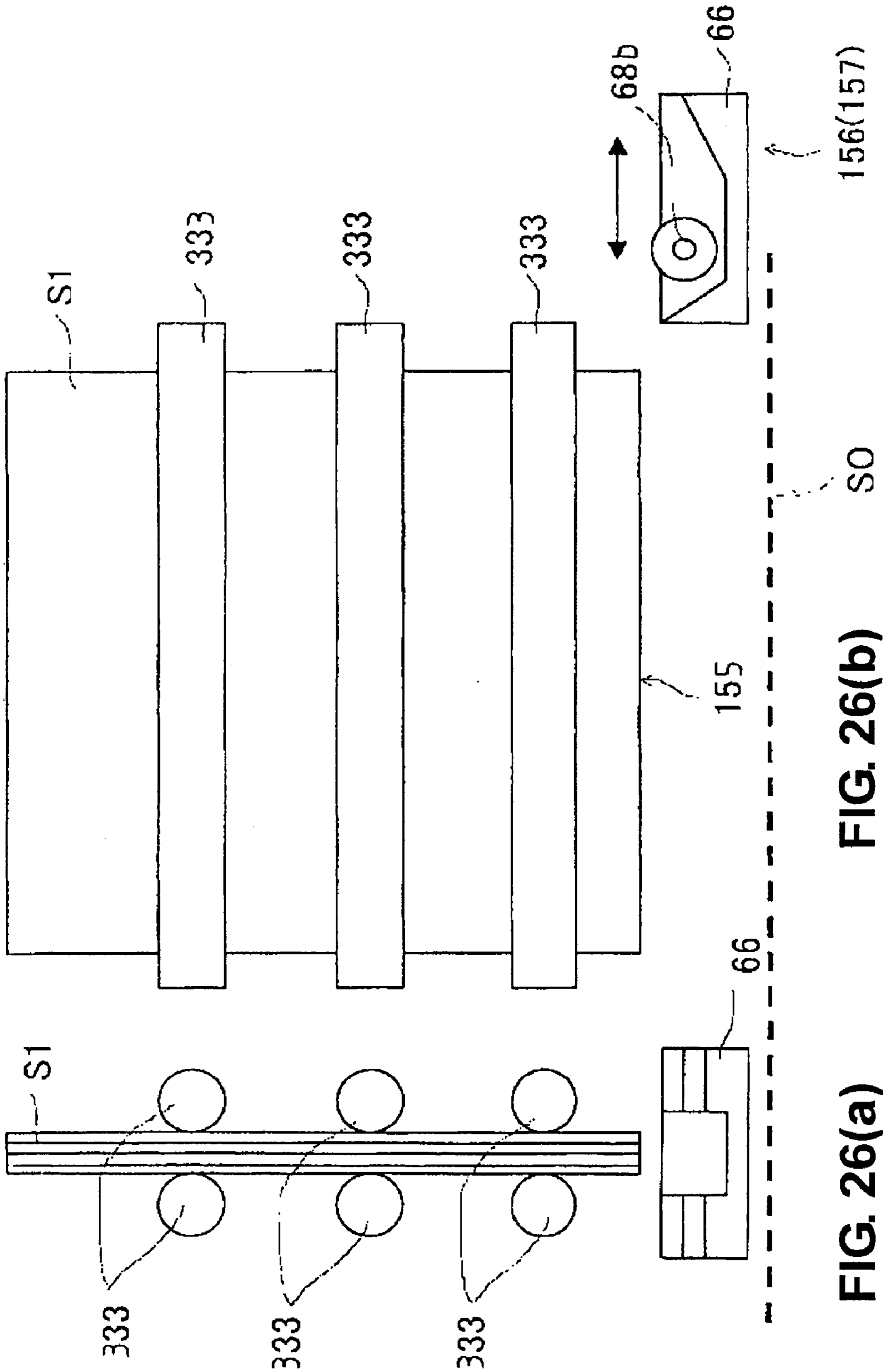
FIGS. 26(*a*) and 26(*b*) are views showing a second embodiment of the transport means for transporting the sheet bundle (before the cover sheet is attached), wherein FIG. 26(*a*) is a side view thereof and FIG. 26(*b*) is a front view thereof.
Figure 29:
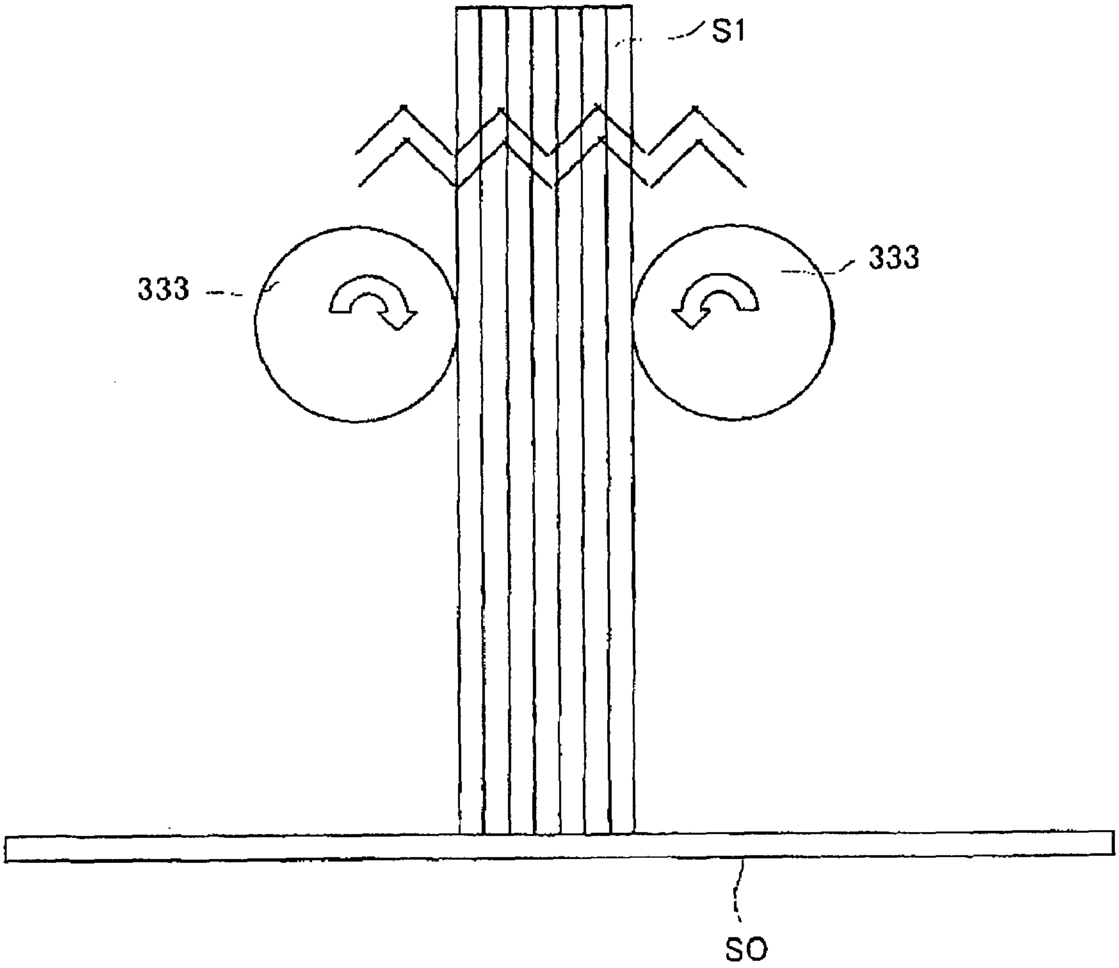
FIG. 29 is a view for explaining the process of correcting a skew of the sheet bundle in the second embodiment of the transport means for transporting the sheet bundle.

FIG. 26(*a*) to FIG. 29 show a second embodiment of the sheet bundle transport mechanism for transporting the sheet bundle S1. The sheet bundle transport mechanism (transport means) comprises a plurality of paired bundle transport rollers 333 as abutting means for transporting the sheet bundle S1 while rotatably pressing both sides of the sheet bundle S1. The paired bundle transport rollers 333 nip the both sides of the sheet bundle S1 and rotate to transport the sheet bundle S1 to the dispensing area 155 disposed below. The adhesive unit 66 moves to the dispensing area 155 where the adhesive is dispensed to the edge of the sheet bundle S1. When the adhesive is dispensed to the edge of the sheet bundle S1, the adhesive unit 66 moves to the idling position 156 or the refilling position 157 to form the transport path for the sheet bundle S1.

Figures 27A, 27B:
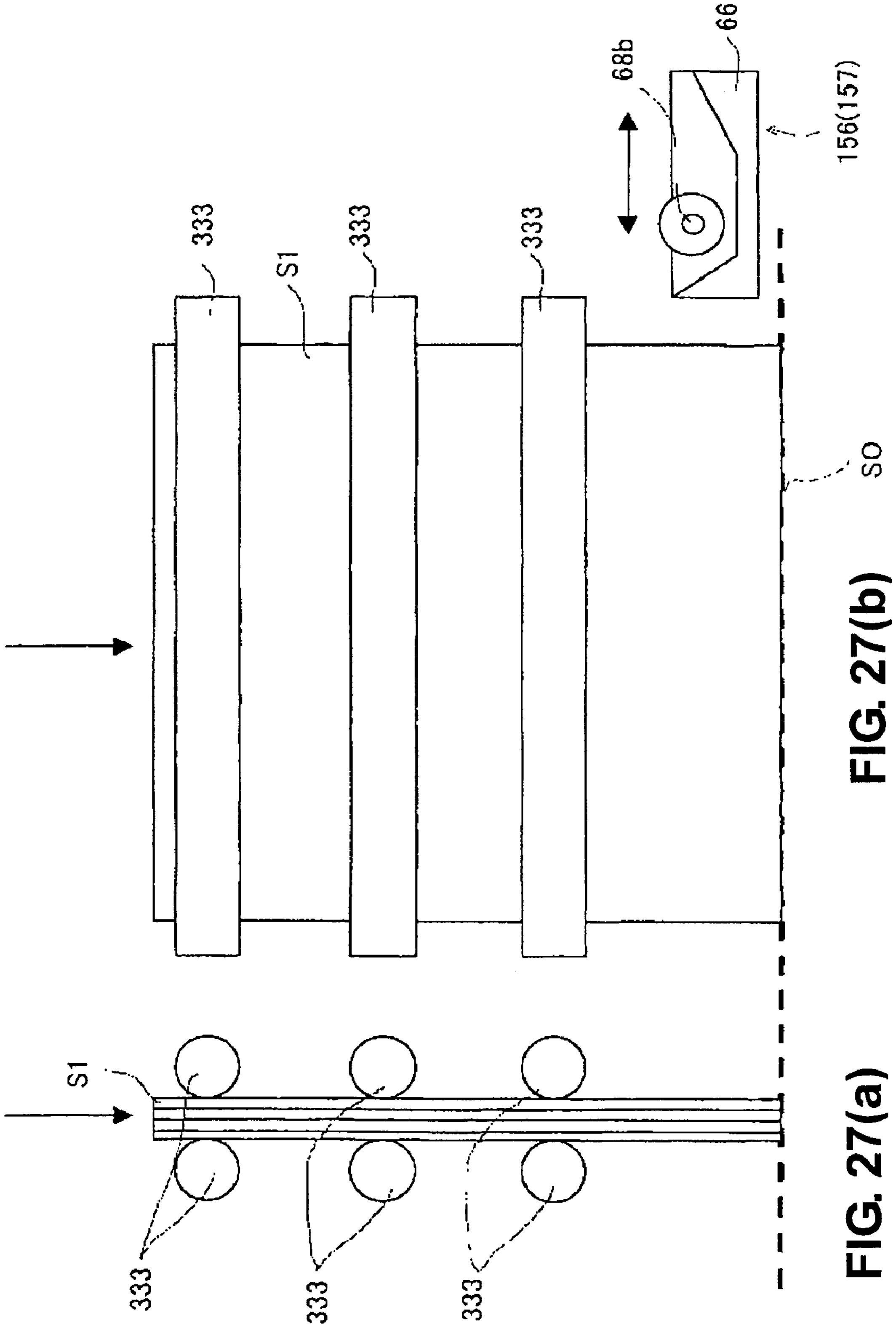
FIGS. 27(*a*) and 27(*b*) are views showing the second embodiment of the transport means for transporting the sheet bundle (after the cover sheet is attached), wherein FIG. 27(*a*) is a side view thereof and FIG. 27(*b*) is a front view thereof.

FIGS. 27(*a*) and 27(*b*) show a state that the paired bundle transport rollers 333 push the edge of the sheet bundle S1 against the cover sheet S0. After the adhesive is dispensed to the edge of the sheet bundle S1 and the adhesive unit 66 moves to the idling position 156 or the refilling position 157 to form the transport path for the sheet bundle S, the paired bundle transport rollers 333 push the sheet bundle S to press the edge of the sheet bundle S against the cover sheet S0. The paired bundle transport rollers 333 rotate in the forward or reverse directions to freely move the sheet bundle S1 upwardly or downwardly.

Figure 28:
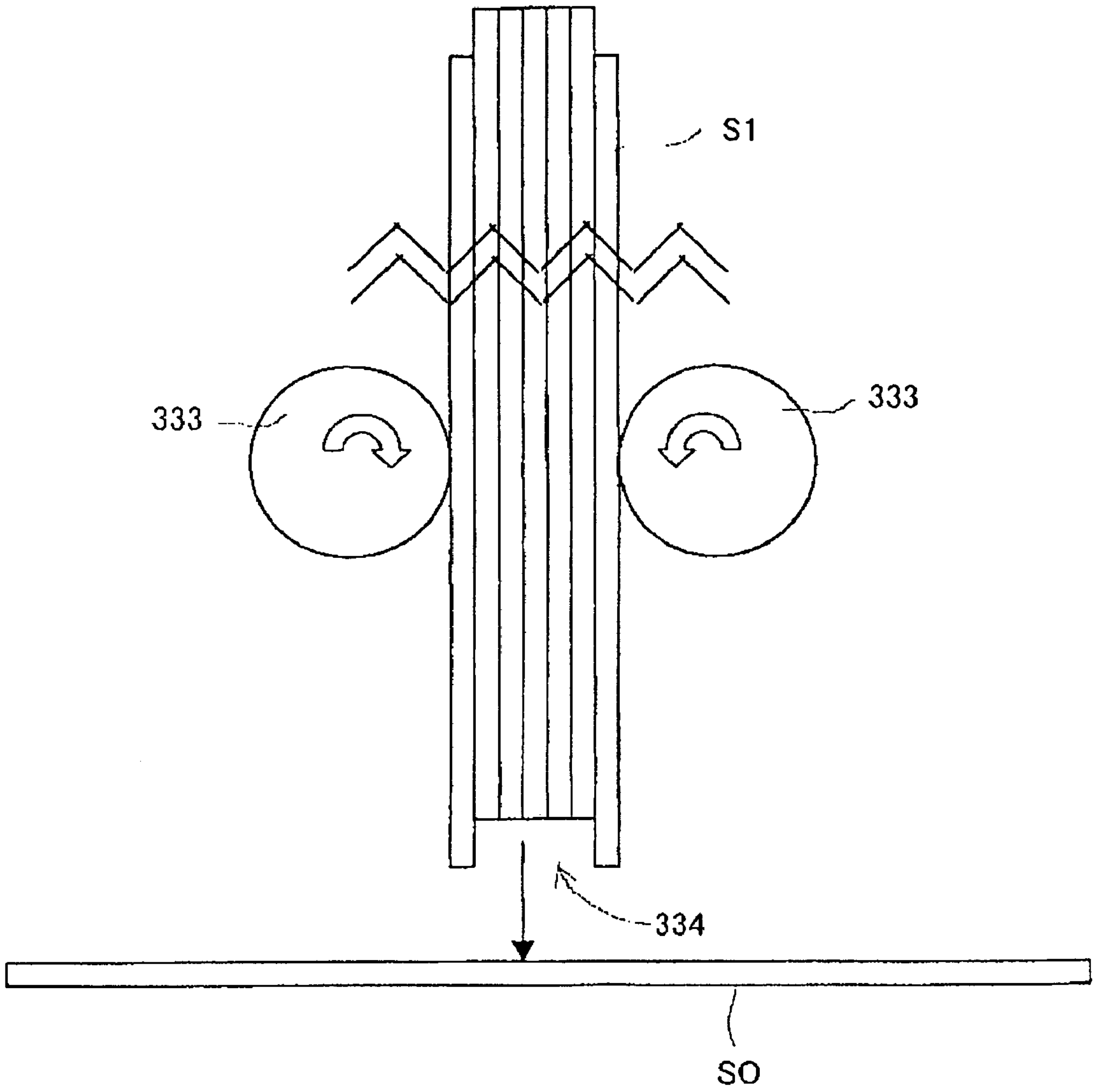
FIG. 28 is a view for explaining a process of correcting a skew of the sheet bundle in the second embodiment of the transport means for transporting the sheet bundle.

A process of correcting the skew of the sheet bundle S1 when the sheet bundle S1 is transported with the edge as the leading edge will be explained. FIG. 28 shows a state that the sheet bundle S1 is shifted when the sheet bundle S1 is transported with the edge as the leading edge. As shown in FIG. 28, when the paired bundle transport rollers 333 rotate to transport the sheet bundle S1 toward the cover sheet S0 with the edge 334 as the leading edge, the sheets S contacting the paired bundle transport rollers 333 are shifted from the sheets S not contacting the paired bundle transport rollers 333. If the cover sheet S0 is attached to the sheet S in the shifted state, the sheet bundle S1 is not completely attached to the cover sheet S0, and the sheet bundle S1 falls apart.

FIG. 29 shows a state that the sheet bundle S1 is pushed against the cover sheet S0. As shown in FIG. 29, when the sheet bundle S1 is pressed against the cover sheet S0, the shifted state of the sheet bundle S1 created during the paired bundle transport rollers 333 transporting the sheet bundle S1 is corrected. Not only in the case of the paired bundle transport rollers 333, it is possible to correct the shifted state in the case that the grippers press the sheet bundle S1 against the cover sheet S0.

As described above, in the embodiment of the present invention, the adhesive dispensing apparatus and image forming apparatus, having the adhesive dispensing unit 22 as the main feature, are provided with the adhesive refilling mechanism K as the refilling means for refilling the adhesive in the container 66*a* in the adhesive unit 66. Therefore, an operator does not need to touch the high temperature container 66*a* to refill the adhesive, thereby making the refilling safe. With the adhesive refilling mechanism K for refilling the adhesive, it is possible to easily refill the adhesive with less frequency, so that a large container is not necessary (possible to use a small adhesive storage container). Accordingly, the adhesive does not stay in the container 66*a* for a long period of time, thereby preventing deterioration of the adhesive.

In the embodiment of the present invention, the adhesive dispensing apparatus and image forming apparatus comprise the moving means for moving the adhesive unit 66 (container 66*a*) to the dispensing area 155 (first position) where the adhesive is dispensed to the edge of the sheet bundle S1 using the dispense roller 68*b*, and the refilling position 157 (second position) for refilling the adhesive to the container 66*a* using the adhesive refilling mechanism K. That is, the first position for dispensing the adhesive is provided separately from the second position for refilling the adhesive. The container 66*a* moves from the first to the second positions to refill the adhesive. Accordingly, it is possible to easily refill the adhesive from above the container 66*a* and melt the adhesive efficiently, regardless of the dispensing method (for example, a case that a space is provided above the container 66*a* for moving the sheet bundle S1 along the container 66*a*, a case different from the embodiments described in detail).

In the embodiment of the present invention, the dispense roller 68*b* and the container 66*a* move along the edge of the sheet bundle S1 in the dispensing area 155 (first position), so that the adhesive melted in the container 66*a* is dispensed to the edge of the sheet bundle S1 using the dispense roller 68*b*. The container 66*a* moves along the sheet bundle S1, so that it is possible to make the transport path for the sheet bundle S1 simple and make the apparatus compact.

In the embodiment of the present invention, the sheets are sequentially transported in a predetermined direction toward the grippers 55*a* and 55*b* as the support means thereof to form the sheet bundle S1, and the sheet bundle S1 having the adhesive dispensed therewith is transported from the grippers 55*a* and 55*b* in the direction substantially same as the predetermined direction. Accordingly, the sheet bundle S1 is transported in the constant direction before and after the dispense roller 68*b* dispenses the adhesive melted in the container 66*a*, so that the sheet bundle S1 is transported in the constant state as it is, thereby shortening the transport time. It is possible to transport the sheet bundle S1 in the constant state as it is after the dispense roller 68*b* dispenses the adhesive, so that the sheet bundle S1 is not bound in the shifted state.

In the adhesive dispensing apparatus and image forming apparatus of the embodiment of the present invention, the sheet bundle S1 is transported after the container 66*a* moves to the retracted position not to interfere the transportation of the sheet bundle S1. Accordingly, it is possible to secure the transport path for the sheet bundle S1 by moving only the container 66*a* and not moving the sheet bundle S1 to avoid the container 66*a*, so that the sheet bundle S1 having the adhesive dispensed thereto is not shifted easily.

In the adhesive dispensing apparatus and image forming apparatus of the embodiment of the present invention, it is possible to refill the adhesive into the adhesive refilling mechanism K regardless of the position of the container 66*a*. Accordingly, an operator can refill the adhesive into the adhesive refilling mechanism K even when the adhesive roller 68*b* dispenses the adhesive to the sheet bundle S1, thereby eliminating time loss for refilling the adhesive into the adhesive refilling mechanism K.

In the adhesive dispensing apparatus and image forming apparatus of the embodiment of the present invention, the heater unit 180 is configured to move along with the container 66*a*. With this configuration, the adhesive is always melted, thereby taking a short period of time for an initial step of the gluing process.

Figures 30A, 30B, 30C:
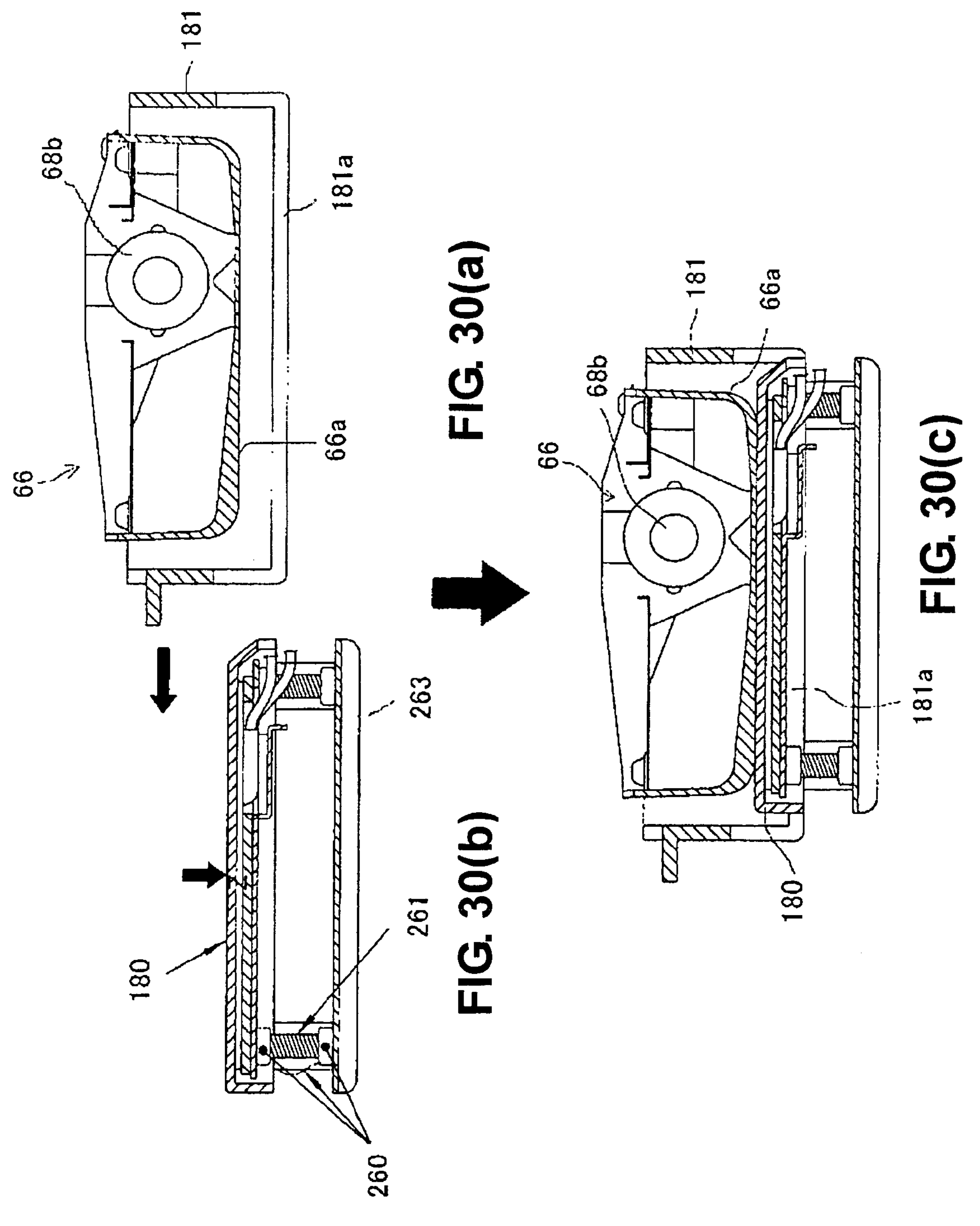
FIGS. 30(*a*) to 30(*c*) are views showing a modified version of the adhesive unit, wherein FIG. 30(*a*) is a sectional view showing a container and a thermal insulation cover separated from a heater unit, FIG. 30(*b*) is a sectional view showing a heater unit fastened at a predetermined position, and FIG. 30(*c*) is a sectional view showing the container contacting the heater unit for heating an adhesive.

FIGS. 30(*a*) to 30(*c*) show a modification of the adhesive unit 66. In the adhesive unit 66 of the embodiment described above, the heater unit 180 is integrally sandwiched between the container 66*a* and the thermal insulation cover 181, and moves as a unit to each position and the regions 155, 156 and 157. In the modification of the adhesive unit 66, the heater unit 180 is separated from the adhesive unit 66, and the container 66*a* and the thermal insulation cover 181 receiving the heater unit 180 move as the adhesive unit 66 to each position and the regions 155, 156, and 157.

Specifically, the heater unit 180 is mounted on a stand 263 fixed at a predetermined position through springs 261. Thermal insulation members 260 are disposed between the springs 261, the heater unit 180A, and the stand 263. An opening 181*a* is formed in a bottom of the thermal insulation cover 181 to receive the container 66*a*. The container 66*a* moves and stays in the heater unit 180 with the thermal insulation cover 181 to melt the adhesive in the container 66*a*. The heater unit 180 directly contacts the container 66*a* through the opening 181*a* in the thermal insulation cover 181, so that the heat of the heater unit 180 is efficiently conducted to the container 66*a*. Accordingly, in the embodiment, the heater unit 180 is removed from the adhesive unit 66, thereby reducing a weight of the adhesive unit 66 and energy for moving the adhesive unit 66.

Figure 31:
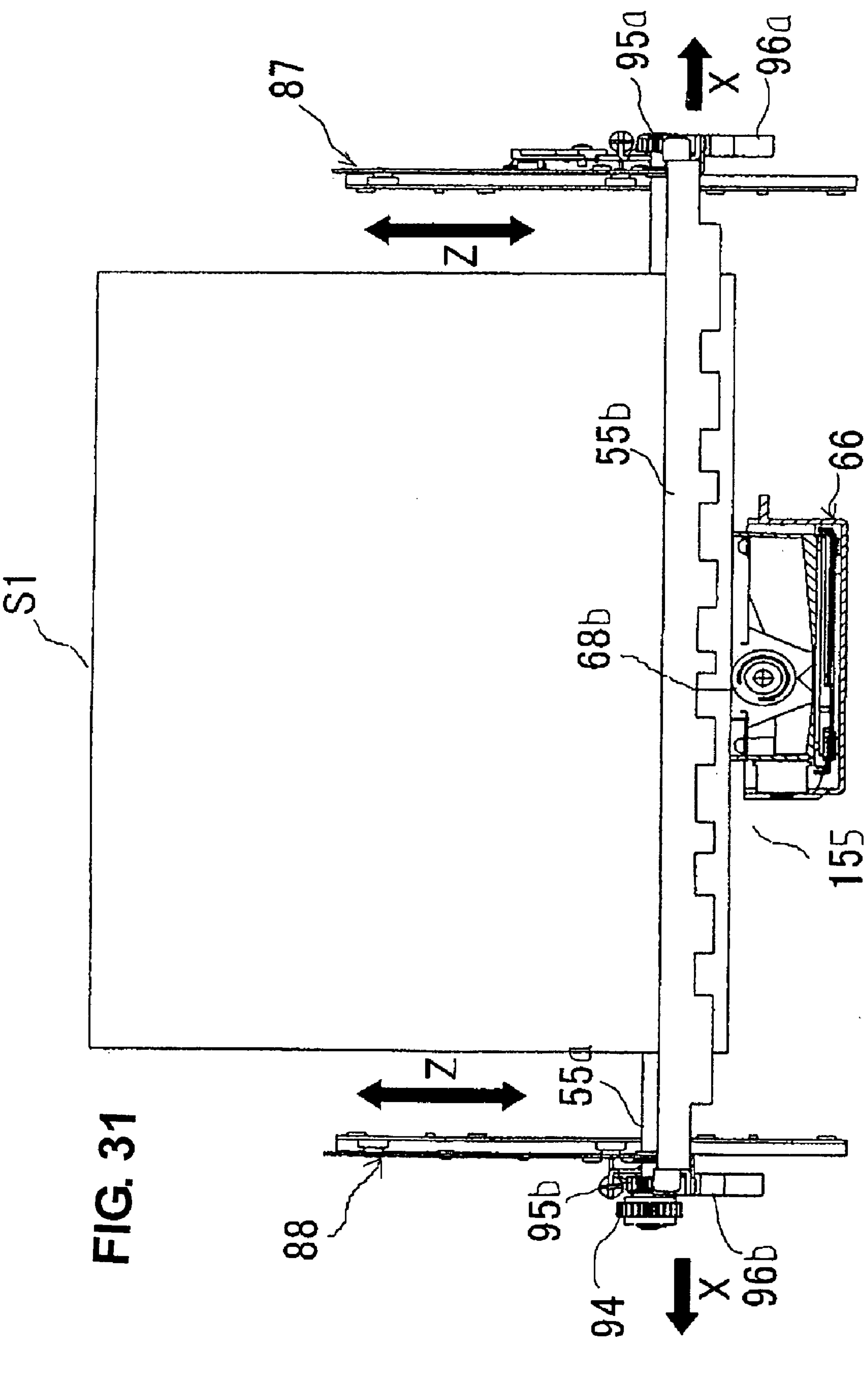
FIG. 31 is a view showing the adhesive unit for dispensing the adhesive to the sheet bundle in a different mode.

FIG. 31 shows a modified example of the dispensing method for dispensing the adhesive to the edge of the sheet bundle S using the adhesive unit 66. In the embodiment described above, the adhesive unit 66 moves to each position and the regions 155, 156, and 157 for dispensing the adhesive to the edge of the sheet bundle S1 held by the grippers 55*a* and 55*b* at a predetermined position. In the modified example, the adhesive unit 66 moves to the dispensing area 155 as well as the refilling position and idling positions 156 and 157, and the adhesive unit 66 stops after moving to the dispensing position 155. The sheet bundle S1 slides toward the adhesive unit 66 at the dispensing area 155, so that the adhesive is dispensed to the edge of the sheet bundle S1. The grippers 55*a* and 55*b* move in the vertical direction (direction Z in FIG. 31) and the lateral direction (direction X in FIG. 31 extending along the edge of the sheet bundle S1) through the ascending and descending mechanism 63*a* and 63*b* described above.

The adhesive dispensing unit 22 may be provided separately with a first moving means for moving the adhesive unit 66 at the refilling position 157 and the idling position 156, and a second moving means for moving the adhesive unit 66 at the dispensing area. In the embodiment described above (FIG. 12 to FIG. 14), the moving mechanism serves as the first moving means and the second moving means, and the embodiment shown in FIG. 31 does not have the second moving means.

As described above, in the embodiment of the present invention, the adhesive dispensing apparatus and image forming apparatus include the adhesive dispensing unit 22 as an essential component, and the adhesive refilling mechanism K for refilling the adhesive in the container 66*a* in the adhesive unit 66. The adhesive refilling mechanism K comprises the adhesive stick storage unit 153 for storing a plurality of the adhesive sticks 163 in a predetermined shape to be refilled in the container 66*a*, and the separating members 131 for dividing the adhesive stick storage unit 153 into sections to form a plurality of the adhesive stick storage units 153*a* for individually storing the adhesive sticks 163, so that the adhesive sticks 163 stored in the adhesive stick storage unit 153 do not adhere to each other. Accordingly, the adhesive sticks 163 are stored in the adhesive stick storage unit 153 separately through the separating members 131 without sticking each other, so that a necessary amount of the adhesive is refilled in the container 66*a* at needed.

In the embodiment of the present invention, the adhesive dispensing apparatus and image forming apparatus comprise the pushing mechanism 240 and feeding mechanism 250 as the adhesive moving means for moving the adhesive sticks 163 in the adhesive stick storage unit 153 to the container 66*a*, and the CPU 159 as the control means for controlling the mechanisms 240 and 250. Accordingly, it is possible to refill and melt a necessary amount of the adhesive, thereby eliminating time loss for refilling and melting.

In the embodiment of the present invention, the adhesive dispensing apparatus and image forming apparatus comprise the sensor (detecting means) 160 for detecting the amount of the adhesive in the container 66*a*. The CPU 159 controls the pushing mechanism 240 and feeding mechanism 250 to move the adhesive sticks 163 according to the amount of the adhesive detected by the sensor 160. With this configuration, it is possible to refill an accurate amount of the adhesive, thereby eliminating time loss for refilling.

In the embodiment of the present invention, the adhesive dispensing apparatus and image forming apparatus include the CPU 159 for controlling the adhesive stick 163 to press against the dispense roller 68*b* as the rotating body, so that the adhesive stick 163 is melted and refilled in the container 66*a* by a predetermined amount. With this configuration, the adhesive stick 163 is pushed against the rotating dispense roller 68*b*, so that the adhesive stick 163 contacts the melted adhesive with a high temperature, thereby efficiently melting and refilling the adhesive stick 163.

The embodiments described above may be modified in various ways. For example, in the embodiments described above, the adhesive stick storage unit 153 rotates and moves to the discharge position 158 through the rotation mechanism 230. The adhesive stick storage unit 153 may move to the discharge position 158 through a moving mode other than rotating.

In the embodiments described above, the adhesive sticks 163 are stored individually in the adhesive stick storage units 153*a* with the substantially cylindrical shape divided by the separating member 131, so that the adhesive sticks 163 do not stick to each other. Other dividing arrangement can be applied as far as the adhesive sticks 163 do not contact each other.

In the embodiments described above, the sheet bundle S1 is formed in the state standing in a substantially vertical direction and is transported in the substantially vertical state. The sheet bundle S1 is not necessarily in the substantially vertical state. Other arrangement can be employed as far as the sheet bundle S1 is formed in a predetermined direction by sequentially transporting a plurality of sheets S, and the sheet bundle S1 having the adhesive dispensed therewith is transported in a direction substantially same as the predetermined direction.

In the transporting mechanism described above, when the sheet bundle S1 is transported with the edge having the adhesive dispensed therewith as the leading edge, the shift caused during the transportation can be corrected, thereby dispensing the adhesive accurately and performing neat binding.

The embodiments of the present invention have been explained, and the invention is not limited to the embodiments, and various modifications can be applied within the scope of the invention. For example, in the embodiments, the sheet bundle S1 is formed in the state standing in a substantially vertical direction and is transported in the substantially vertical state. The sheet bundle S1 is not necessarily in the substantially vertical state, and other state can be employed as far as the sheet bundle S1 is transported with the edge having the adhesive dispensed therewith as the leading edge.

While the invention has been explained with reference to the specific embodiments of the invention, the explanation is illustrative and the invention is limited only by the appended claims.

What is claimed is:

1. An adhesive dispensing apparatus for dispensing an adhesive on a sheet bundle, comprising:

support means for supporting the sheet bundle, dispensing means disposed adjacent to the support means for dispensing the adhesive on an edge of the sheet bundle supported by the support means, cover sheet supply means for placing a cover sheet under the edge of the sheet bundle before the dispensing means dispenses the adhesive on the edge of the sheet bundle, transport means disposed adjacent to the support means for transporting the sheet bundle in a transport direction from the side of the edge, to which the adhesive is applied, refilling means for refilling the adhesive to the dispensing means, and moving means for moving the dispensing means between a dispensing position where the adhesive is dispensed to the edge of the sheet bundle and a refilling position where the adhesive is supplied to the dispensing means from the refilling means.

2. An adhesive dispensing apparatus according to claim 1, wherein in the refilling position, the dispensing means does not hinder transporting of the sheet bundle by the transport means.

3. An adhesive dispensing apparatus according to claim 1, wherein said dispensing means includes melting means for heating and melting the adhesive, an adhesive container for storing the adhesive in a melted state, and a rotating body for dispensing the adhesive stored in the adhesive container on the edge of the sheet bundle.

4. An adhesive dispensing apparatus according to claim 1, wherein said dispensing means includes an adhesive discharging member for discharging the adhesive to the edge of the sheet bundle.

5. An image forming apparatus comprising the adhesive dispensing apparatus according to claim 1.

6. An adhesive dispensing apparatus according to claim 1, wherein said transport means transports the sheet bundle in a direction intersecting a direction that the dispensing means is moved by the moving means.

7. An adhesive dispensing apparatus according to claim 1, wherein said support means supports the sheet bundle in a substantially vertical direction, said dispensing means being disposed below the support means for providing the adhesive at a lower edge of the sheet bundle, said transport means transporting the sheet bundle downwardly from a side of the lower edge in the transport direction.

8. An adhesive dispensing apparatus according to claim 1, wherein said cover sheet supply means is disposed below the dispensing means for setting the cover sheet at a predetermined position.

9. An adhesive dispending apparatus according to claim 1, wherein said support means includes a back plate disposed substantially vertically, and a stacking plate disposed under the back plate for supporting the edge of the sheet bundle, said stacking plate being movable between a stacking position for supporting the sheet bundle and a retracted position for releasing the sheet bundle.

10. An image forming apparatus comprising:

image forming means for forming an image on a sheet, sheet transfer means for transferring the sheet passing through the image forming means to a downstream side, stacking means for stacking the sheets transferred by the sheet transfer means to form a sheet bundle, support means for supporting the sheet bundle, dispensing means disposed adjacent to the support means for dispensing the adhesive on an edge of the sheet bundle supported by the support means, cover sheet supply means for placing a cover sheet under the edge of the sheet bundle before the dispensing means dispenses the adhesive on the edge of the sheet bundle, and sheet bundle transport means disposed adjacent to the support means for transporting the sheet bundle in a transport direction from a side of the edge, to which the adhesive is applied.

11. An image forming apparatus according to claim 10, wherein said cover sheet supply means places the cover sheet at a predetermined position, said sheet bundle transport means pressing the edge of the sheet bundle with the adhesive thereon against the cover sheet placed at the predetermined position.

12. An image forming apparatus according to claim 11, further comprising a first transport path for supplying the sheet to the stacking means, a second transport path for transporting the cover sheet by the cover sheet supply means, and a common transport path connected to the first and second transport paths for transporting the sheet and the cover sheet.

13. An image forming apparatus according to claim 11, wherein said cover sheet supply means is provided on a side of the image forming means relative to the sheet transfer means.

14. An image forming apparatus according to claim 12, wherein said cover sheet supply means is provided on a side of the image forming means relative to the sheet transfer means.

15. An adhesive dispensing apparatus according to claim 1, further comprising a stacking unit situated adjacent to the support means, said stacking unit receiving the sheets one by one and aligning the sheets vertically to form the sheet bundle, said support means holding the sheet bundle at the stacking unit.

16. An adhesive dispensing apparatus according to claim 15, further comprising a first transport path for supplying the sheet to the stacking unit, a second transport path for transporting the cover sheet by the cover sheet supply means, and a common transport path connected to the first and second transport paths for transporting the sheet and the cover sheet.

17. An image forming apparatus according to claim 10, wherein said stacking means is situated adjacent to the support means, said stacking unit receiving the sheets one by one and aligning the sheets vertically to form the sheet bundle, said support means holding the sheet bundle at the stacking unit.

* * * * *